US012106298B1

(12) United States Patent
Durieux et al.

(10) Patent No.: US 12,106,298 B1
(45) Date of Patent: Oct. 1, 2024

(54) DEVELOPMENT ENVIRONMENT FOR PAYMENT SOLUTIONS USING SOFTWARE-DEFINED CARD PROCESSING

(71) Applicant: switstack, Inc., San Francisco, CA (US)

(72) Inventors: Vincent Durieux, Campbell, CA (US); Olivier Chauvineau, Montreal (CA); Alexandre Munsch, Nantes (FR); Emmanuel Haydont, Castanet-Tolosan (FR)

(73) Assignee: switstack, Inc.

( * ) Notice: Subject to any disclaimer, the term of this patent is extended or adjusted under 35 U.S.C. 154(b) by 0 days.

(21) Appl. No.: 18/431,785

(22) Filed: Feb. 2, 2024

(51) Int. Cl.
*G06Q 20/38* (2012.01)
*G06Q 20/34* (2012.01)

(52) U.S. Cl.
CPC ......... *G06Q 20/389* (2013.01); *G06Q 20/351* (2013.01)

(58) Field of Classification Search
CPC .......................... G06Q 20/389; G06Q 20/351
USPC .................................................. 717/105–121
See application file for complete search history.

(56) References Cited

U.S. PATENT DOCUMENTS

| | | | | |
|---|---|---|---|---|
| 6,068,184 | A * | 5/2000 | Barnett .................... | G07F 19/20 235/379 |
| 6,609,114 | B1 * | 8/2003 | Gressel ................ | G06Q 20/105 705/50 |
| 8,238,650 | B2 * | 8/2012 | Gotting ................ | G06V 10/454 382/173 |
| 8,639,625 | B1 * | 1/2014 | Ginter ..................... | G06F 21/78 705/50 |
| 9,519,901 | B1 * | 12/2016 | Dorogusker ..... | G06Q 20/40145 |
| 10,366,378 | B1 * | 7/2019 | Han ..................... | G06Q 20/204 |
| 10,395,223 | B2 * | 8/2019 | Muthu ................ | G06Q 20/405 |
| 10,438,175 | B2 * | 10/2019 | Finch ................... | G06Q 20/204 |
| 10,698,795 | B2 | 6/2020 | Riddick et al. | |
| 10,963,856 | B2 * | 3/2021 | Finch ................... | G06Q 20/327 |
| 11,017,380 | B1 * | 5/2021 | Wall ....................... | G06Q 20/24 |

(Continued)

FOREIGN PATENT DOCUMENTS

WO  2018076905 A1  5/2018

OTHER PUBLICATIONS

Cheng et al, "Research on blockchain technology in cryptographic exploration", IEEE, pp. 120-123 (Year: 2020).*

(Continued)

*Primary Examiner* — Anil Khatri
(74) *Attorney, Agent, or Firm* — Daylight Law, P.C.

(57) ABSTRACT

Methods and systems related to design, test, development, certification, deployment, and maintenance infrastructures for payment solutions are disclosed herein. A disclosed system includes a software binaries generator for generating an executable for a source code file. The source code file includes an EMV kernel. The disclosed system also includes a testing environment that accepts the executable and simulates the executable with a virtual payment processing hardware system in a simulation. The testing environment verifies EMV compliance for the executable via the simulation. The disclosed system also includes a security module that generates a proof of trust for the executable in response to the testing environment verifying EMV compliance for the executable and provides the proof of trust for the executable for an external EMV compliance authority.

18 Claims, 12 Drawing Sheets

(56) References Cited

U.S. PATENT DOCUMENTS

| | | | |
|---|---|---|---|
| 11,099,835 B1 * | 8/2021 | Wall | G06F 8/61 |
| 11,157,393 B2 | 10/2021 | Szerenyi et al. | |
| 11,386,410 B2 * | 7/2022 | Bartrim | G06Q 20/027 |
| 11,609,757 B1 | 3/2023 | Wall et al. | |
| 11,625,699 B1 * | 4/2023 | Adkins | G06Q 20/1085 |
| | | | 705/43 |
| 11,922,384 B2 * | 3/2024 | Filipiak | H04L 9/3213 |
| 2020/0134587 A1 * | 4/2020 | Rice | G06Q 20/40 |
| 2022/0005024 A1 * | 1/2022 | Johnson | G06Q 20/382 |

OTHER PUBLICATIONS

Balfe et al, "e-EMV: Emulating EMV for Internet Payments with Trusted Computing Technologies", ACM, pp. 81-92 (Year: 2008).*

Haifeng et al, "Block-chain based cloud storage integrity verification scheme for recoverable data", IEEE, pp. 280-285 (Year: 2022).*

Duarte et al, "Multi-Environment Software Testing on the Grid", ACM, pp. 61-68 (Year: 2006).*

Selimis, et al, "Software and Hardware Issues in Smart Card Technology", IEEE, pp. 143-152 (Year: 2009).*

* cited by examiner

```
MOKA_TRACE_S("[EMVCo Book C-2 S456.37]\n");
reader_contactless_floor_limit=bcd_array_to_decimal_value(
    VALUE_DF81(0x23),
    LENGTH_DF81(0x23));
If (amount > reader_contactless_floor_limit) {
  MOKA_TRACE_S("[EMVCo Book C-2 S456.37]\n");
  MOKA_TRACE_W("[TVR] riase bit transaction exceeds floor limit\n");
  MOKA_ERROR_FUNC(
      emvco_tools_or_tvr_byte(tags_data_base, 4, 0x80));
}
```

1101

| Terminal Verification Results | | |
|---|---|---|
| Byte 2 | b8 | ICC and terminal have different application versions |
| | b7 | Expired application |
| | b6 | Application not yet effective |
| | b5 | Requested service not allowed for card product |
| | b4 | New card |
| | b3-1 | Each bit RFU |
| Byte 3 | b8 | Cardholder verification was not sucessful |
| | b7 | Unrecongnised CVM |
| | b6 | PIN Try Limit exceeded |
| | b5 | PIN entry required and PIN pad not present or not working |
| | b4 | PIN entry required, PIN pad present, but PIN was not entered |
| | b3 | Online PIN entered |
| | b2-1 | Each bit RFU |
| Byte 4 | b8 | Transaction exceeds floor limit |
| | b7 | Lower consecutive offline limit exceeded |
| | b6 | Upper consecutive offline limit exceeded |
| | b5 | Transaction selected randomly for online processing |
| | b4 | Merchant forced transaction online |
| | b3-1 | Each bit RFU |

```
C mastercard_read_record_c  src\service\cpa\mastercard  ②
MOKA_ERROR_FUNC(emvco_tools_or_tvr_byte(
MOKA_ERROR_FUNC(emvco_tools_or_tvr_byte(
C mastercard_procedure_cvm_selection.c  src\service\cpa\mastercard\procedures  ⑤
MOKA_ERROR_FUNC(emvco_tools_or_tvr_byte(
MOKA_ERROR_FUNC(emvco_tools_or_tvr_byte(
MOKA_ERROR_FUNC(emvco_tools_or_tvr_byte(
MOKA_ERROR_FUNC(emvco_tools_or_tvr_byte(
MOKA_ERROR_FUNC(emvco_tools_or_tvr_byte(
C mastercard_procedure_processing_restrictions.c  src\service\cpa\mastercard\procedures  ⑪
MOKA_ERROR_FUNC(emvco_tools_or_tvr_byte(
MOKA_ERROR_FUNC(emvco_tools_or_tvr_byte(
MOKA_ERROR_FUNC(emvco_tools_or_tvr_byte(
MOKA_ERROR_FUNC(emvco_tools_or_tvr_byte(
MOKA_ERROR_FUNC(emvco_tools_or_tvr_byte(
MOKA_ERROR_FUNC(emvco_tools_or_tvr_byte(
MOKA_ERROR_FUNC(emvco_tools_or_tvr_byte(
MOKA_ERROR_FUNC(emvco_tools_or_tvr_byte(
MOKA_ERROR_FUNC(emvco_tools_or_tvr_byte(
MOKA_ERROR_FUNC(emvco_tools_or_tvr_byte(
C mastercard_static_s3_waiting_cpa_response.c  src\service\cpa\mastercard\states  ①
MOKA_ERROR_FUNC(emvco_tools_or_tvr_byte(tags_data_base 5, 0x01));
C mastercard_static_s3R1_common_processing.c  src\service\cpa\mastercard\states  ①
emvco_tools_or_tvr_byte(tags_data_base,1, 0x50));
C mastercard_static_s9_waiting_for_generate_ac_response.c  src\service\cpa\mastercard\states  M
emvco_tools_or_tvr_byte(
C mastercard_static_s456_common_processing.c  src\service\cpa\mastercard\states  ④
emvco_tools_or_tvr_byte(tags_data_base, 1, 0x20));
emvco_tools_or_tvr_byte(tags_data_base, 1, 0x04));
emvco_tools_or_tvr_byte(tags_data_base, 1, 0x04));
emvco_tools_or_tvr_byte(tags_data_base, 1, 0x80));
```

1202

```
MOKA_TRACE_S("[EMVCo Book C-2 S456.37]\n");
reader_contactless_floor_limit=bcd_array_to_decimal_value(
    VALUE_DF81(0x23),
    LENGTH_DF81(0x23));
If (amount > reader_contactless_floor_limit) {
  MOKA_TRACE_S("[EMVCo Book C-2 S456.37]\n");
  MOKA_TRACE_W("[TVR] riase bit transaction exceeds floor limit\n");
  MOKA_ERROR_FUNC(
        emvco_tools_or_tvr_byte(tags_data_base, 4, 0x80));
}
```

FIG. 12

DEVELOPMENT ENVIRONMENT FOR PAYMENT SOLUTIONS USING SOFTWARE-DEFINED CARD PROCESSING

BACKGROUND

Testing payment solution software can be a complex and challenging task due to the inherent dependence on physical hardware, and corresponding Software Development Kits (SDK). Unlike purely software-based applications, payment solutions require interaction with tangible devices to conduct transactions. This reliance on hardware introduces various obstacles during the testing phase, as it necessitates the availability of payment terminals and other related equipment. Coordinating and maintaining these devices for development and testing purposes can be costly, time-consuming and resource intensive. Additionally, ensuring compatibility with a diverse range of terminals from different brands further complicates the development and testing process. The need to replicate various payment scenarios, including different card types and transaction methods, adds an extra layer of difficulty. Consequently, meticulous planning and investment in hardware resources are essential to conduct thorough and effective testing of payment solution software.

The difficulty of developing payment solution software comes with additional challenges due to the mandatory certification processes imposed by payment networks that enable payment processing networks to operate and payment media issuers that enable payment media processing to operate. For example, the Europay-Mastercard and Visa consortium (EMVCo or EMV) requires certifications for EMV compliant kernels for payment solution software. EMV certifications are crucial for ensuring compliance with global standards for payment card transactions. Each version of the payment solution software must undergo rigorous evaluation and certification processes, which includes thorough testing to verify adherence to security protocols and interoperability with payment infrastructure and issued card profiles. These certifications are essential to guarantee the software's compatibility with various payment networks and payment terminals. The stringent requirements set by certification bodies make the development process intricate, as developers must meticulously address security concerns, follow specific guidelines and adapt to evolving industry standards. The time and resources invested in obtaining these certifications contribute to the complexity of developing payment solution software, but they are crucial steps in ensuring the reliability and security of financial transactions. Minor changes to a payment solution can result in a massive developmental and logistical challenge as all the hardware specific testing environments need to be utilized and the various versions of the payment solution software for each independent hardware environment need to be updated and recertified.

SUMMARY

This disclosure relates to design, test, analysis, certification, deployment, and maintenance infrastructures for payment solutions. The payment solutions may be required to be certified in accordance with the requirements of a certification authority before they can be deployed. The payment solutions may include payment media kernels, such as EMV Level 2 kernels for card processing, and additional pieces of software such as security layers, protocols adaptation, merchant rules, regional payment rules, etc. For example, the payment solutions may include EMV Level 2 kernels which are required to be certified by EMV accredited laboratories before they can be deployed in a payment system. As used herein, the term payment solution refers to a software system, including libraries, scripts, kernels, and APIs, which is designed to operate in one or more hardware environments for purposes of processing payment information and authenticating a holder of the payment information through communication with payment media and an authentication service. As used herein, the term payment system refers to a combination of a payment solution and a hardware environment. The payment system can include protocols to allow the payment solution to communicate with the primary and secondary actors of the payment system (e.g., a point of sale and a payment processor). Although the title of this disclosure references card processing the approaches disclosed herein are applicable to processing payment information from any form of payment media including a magnetic strip, card chip, mobile phone, key fob, biometrically verified voice input, and any other payment media.

The approaches disclosed herein utilize the concept of software-defined card processing (SDCP) which facilitates a fluid design, implementation, testing, deployment, and maintenance process for payment solutions. Again, while the term SDCP references "card" processing, the concept of an SDCP is applicable to the processing of any payment media. An infrastructure which utilizes SDCP can be used to generate an executable for any hardware environment for a payment solution, including payment processing hardware having any form factor and payment processing hardware designed by any of a multitude of vendors, without the cumbersome requirement of having physical instantiations of each environment. Furthermore, the SDCP can be used to design and develop the payment solution such that testing and development of a payment solution are conducted in a rapid feedback loop. This rapid feedback loop can include testing the payment solution for compliance with a certification authority in the various hardware environments mentioned above.

Using the approaches described in the prior paragraph, a payment solution can be tested and certified in a unified infrastructure and be made available for usage with various physical hardware environments. Such unified infrastructures can make development and testing of payment solutions more fluid, allow for the centralization of updates to the payment solutions, and assure compliance of the payment solutions with a certification authority's requirements during all phases of the payment solutions' life cycle. Various other benefits and advantages of the infrastructures disclosed herein, and the SDCP approaches disclosed herein, are provided in the detailed description below.

BRIEF DESCRIPTION OF THE DRAWINGS

The accompanying drawings illustrate systems, methods, and embodiments of various aspects of the disclosure. A person with ordinary skill in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings.

The components in the figures are not necessarily to scale, emphasis instead being placed upon illustrating principles.

FIG. 11 provides artifacts from an analysis block to illustrate the operation of an analysis conducted at the semantic level of EMV Level 2 compliance in accordance with specific embodiments of the inventions disclosed herein.

FIG. 12 provides outputs from an analysis block to illustrate the operation of an analysis conducted at the semantic level of EMV Level 2 compliance in accordance with specific embodiments of the inventions disclosed herein.

DETAILED DESCRIPTION

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different systems and methods for integrated design, test, analysis, certification, deployment, and maintenance infrastructures for payment solutions will be described in detail in this disclosure. The methods and systems disclosed in this section are non-limiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Figure 1:
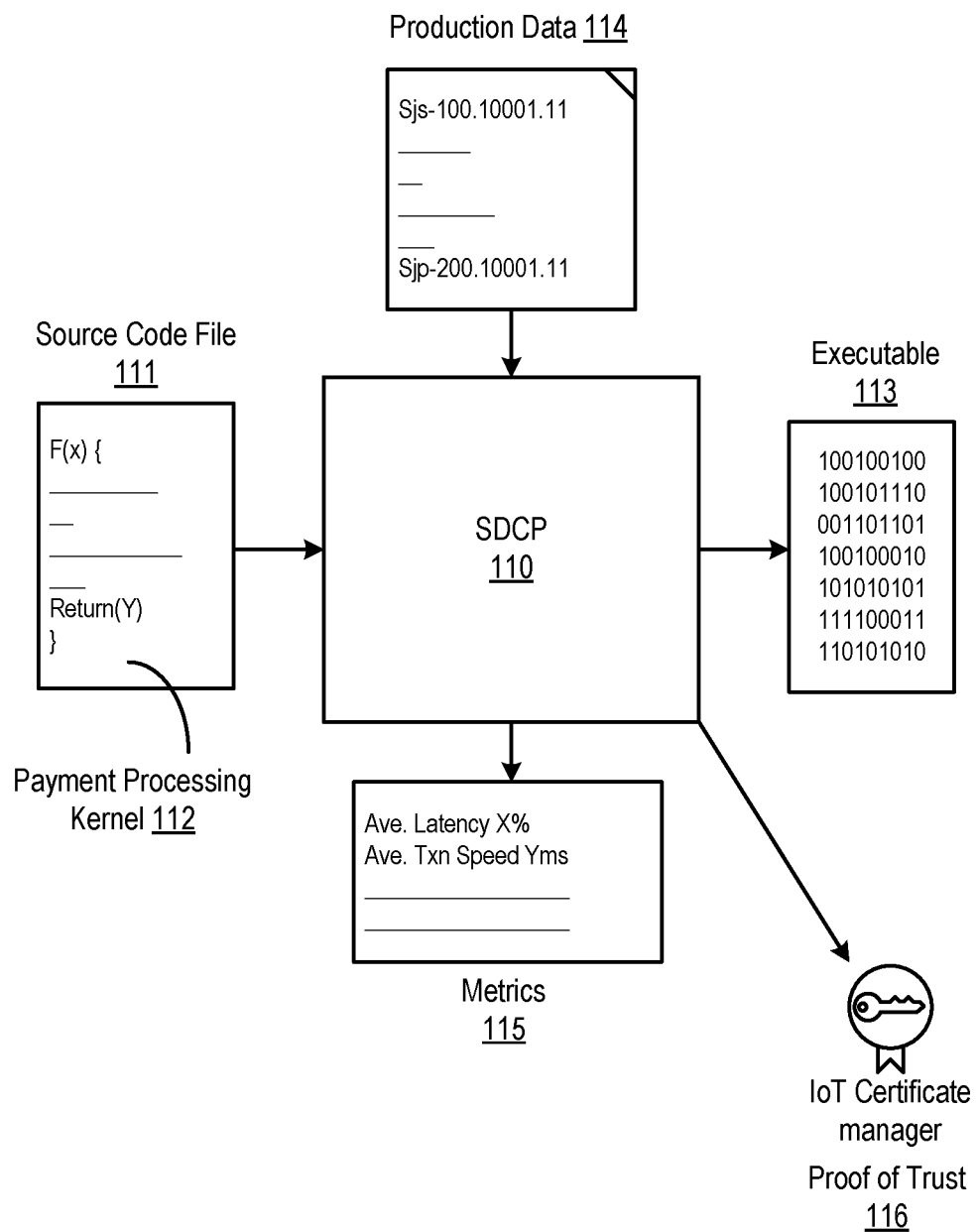
FIG. 1 provides a block diagram of inputs and outputs for an SDCP infrastructure in accordance with specific embodiments of the inventions disclosed herein.
Figure 2:
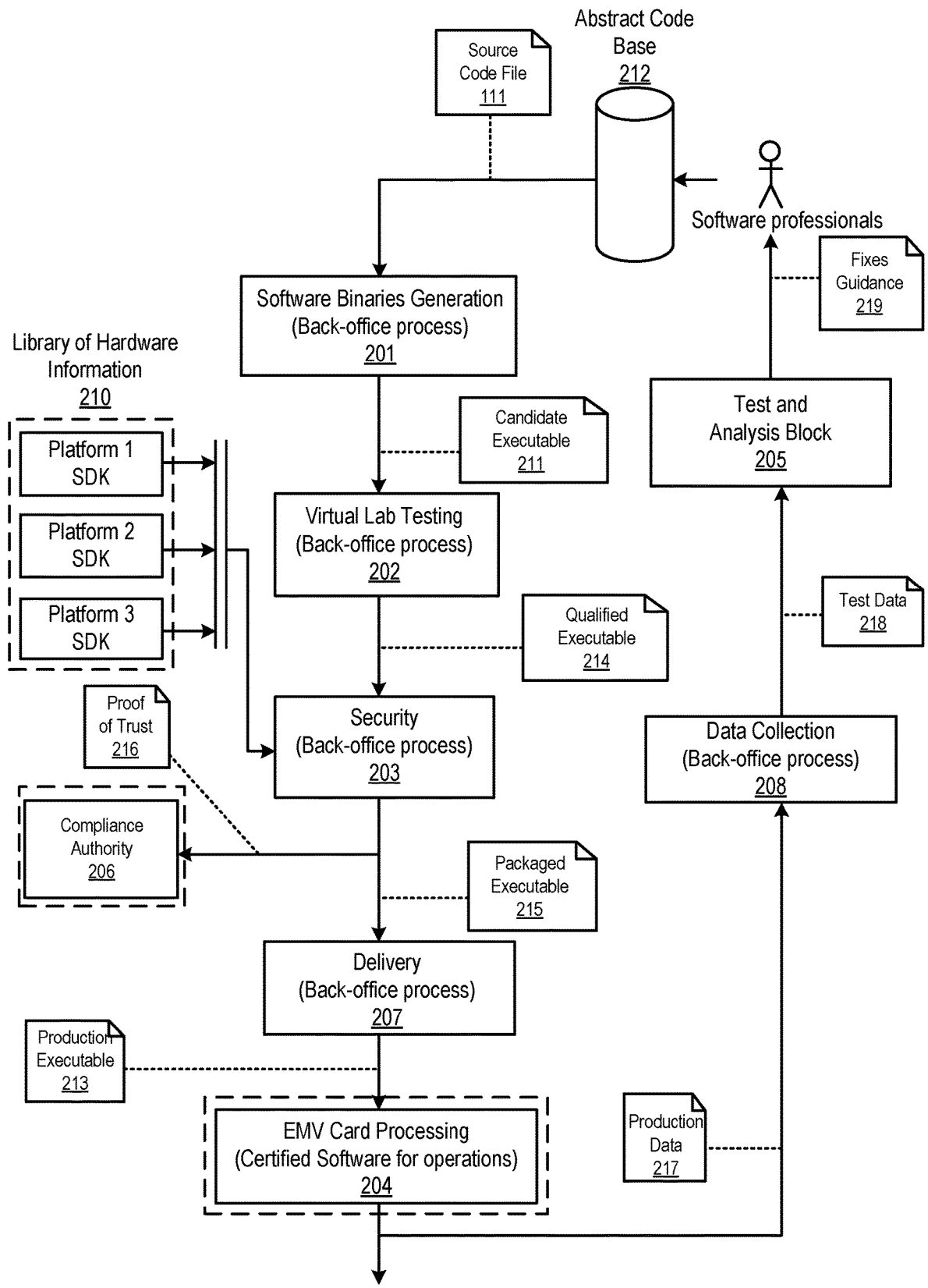
FIG. 2 provides a flow chart of the operation of a specific implementation of an SDCP infrastructure in accordance with specific embodiments of the inventions disclosed herein.

FIG. 1 provides a block diagram of inputs and outputs for an SDCP infrastructure 110 in accordance with specific embodiments of the inventions disclosed herein. FIG. 2 provides a flow chart of the operation of a specific implementation of SDCP infrastructure 110 that will be referenced during the discussion of FIG. 1 as appropriate to explain details of the high-level system. For the avoidance of doubt, the blocks in FIG. 1 and FIG. 2 represent both functional components of the SDCP infrastructure 110, or external components that communicate with the SDCP infrastructure 110, and also represent data that is exchanged between the functional blocks during operation. Furthermore, dotted rectangles denote portions of the diagram that are external to the SDCP infrastructure 110.

A first input to SDCP infrastructure 110 is a source code file 111. The source code file can be written in a human readable scripting language such as Java, C #, Python, PHP, Ruby, JacaScript, C, C++, Golang, Swift, Kotlin, Objective-C, or Rust. The source code file 111 can be provided by a software developer. The software developer can write the source code file 111 using an integrated development environment (IDE) that may be part of the SDCP infrastructure 110. The source code file 111 can encode various portions of a payment solution including a payment media kernel such as an EMV Level 2 Kernel 112. The payment media kernel can be modified by a programmer using the IDE and delivered to the SDCP infrastructure 110. The SDCP infrastructure 110 can assist in the design, testing, analysis, certification, deployment, and maintenance of the payment solution described by the source code file 111 including the payment media kernel. The connection between the source code file 111 and the SDCP infrastructure 110 infrastructure can be an API or application-level wizard for receiving the source code file from a user. In specific embodiments, the connection can be facilitated by a platform which allows code to be pushed into an abstract code base. The platform can be integrated with an IDE.

The source code file 111 can define a software system in the form of static files containing coded language instructions ready to be compiled. The source code file can include a payment media kernel such as an EMV Level 2 Kernel. Additionally, the source code file 111 can also include all the code required to perform ancillary tasks and activities like code formatters, unit tests vectors, documentation generators, mount execution environments, etc. The source code file 111 can also include two different API levels. A first level of API can enable test triggering (i.e., so a primary actor can interface onto the executable code). A second level of API can interact with any platform being virtualized (i.e., so a secondary actor can provide services to the executable code). As used herein a primary actor refers to a system that serves as the genesis of a stimulus for a simulation while a secondary actor refers to a system that can receive inputs as part of the simulation and may provide services in response to those inputs.

As stated previously, the SDCP infrastructure 110 can provide inputs for a simulation of the payment solution that is described by source code file 111, simulate a hardware environment for the payment solution, and can process the outputs necessary to test the functionality of the payment solution. Throughout this disclosure, the term "simulated" will refer to the virtual environment provided by SDCP to test the payment solution, while the term "deployed" will refer to the real-world environment in which the payment solution has been integrated into a payment system for purposes of processing payment information in commercial transactions. Portions of the payment solutions, such as the payment processing kernel that is part of source code file 111, can have various responsibilities and functionality associated with the processing of payment information. Both the inputs and the outputs associated with this functionality, and the data and interfaces needed for testing this functionality, can be provided by a simulation within the SDCP infrastructure 110 as disclosed below. For example, a payment media kernel will need to provide the functionality required to process all the payment media corresponding to its brand (e.g., a Mastercard EMV kernel processes Mastercard EMV cards while a Visa EMV kernel processes Visa EMV cards). Accordingly, the SDCP infrastructure 110 can provide simulated inputs from both the hardware payment media side of the payment media kernel operation and the high-level side of the payment media kernel operation to assure that the payment media kernel is capable of processing all the payment media corresponding to its brand.

The inputs to the payment media kernel can take on various forms depending upon the kernel that is being tested. The inputs to the kernel can include transaction-related data such as an amount, date, time, transaction type, currency code, etc. In deployment, this data can come from primary actors such as a point-of-sale application. As described below, in the simulated environment of SDCP infrastructure 110 this data can be provided by a testing environment to simulate the interface with the point-of-sale application or other system that provided transaction data. The kernel can also receive EMV Configuration information such as supported card applications and their versions, merchant risk parameters, contactless limits, floor limits, cardholder authentication methods, supported cryptographic methods, terminal country codes, etc. In deployment, this data can come from primary actors such as a payment gateway. During deployment, this data can be provided by the merchant's acquirer. In the simulated environment of SDCP infrastructure 110 this data can be provided by a testing environment. Like the data that is provided from the hardware side, the data provided from the payment gateway can be provided by a portion of the testing environment that is agnostic to the various different protocols and interfaces offered by different higher level systems. The kernel can also receive Certificate Authority Public Keys to authenticate cards offline during a transaction. In deployment, this data comes from payment networks such as MasterCard, Visa, Amex, Discover, Diners Club, UnionPay, JCB, Maestro, CUP, RuPay, Interact, NETS, Bancontact, EFTPOS, and others. However, in the simulated environment in SDCP infrastructure 110 this data can be provided by the testing environment. In all these cases, the inputs can be test data that is provided specifically for SDCP infrastructure 110. However, as will be described below, in specific embodiments, the inputs are production data, such as production data 114, that has been harvested by the infrastructure for use by the SDCP.

Payment media kernels can also receive additional inputs during the flow of a payment transaction including the issuer's data objects received in response to the commands which the kernel sends to the payment media (e.g., an NFC card). These data objects can include issuer risk parameters, cryptographic certificates, cardholder information, account numbers, etc. In total, there are around 200 parameters that are managed by an EMV card processing kernel to process a transaction in compliance with a typical brand's functional rules. In deployment, this data comes from the payment media used in the transaction (e.g., a magnetic strip, card chip, mobile phone, key fob, biometrically verified voice input, etc.). However, in the simulated environment of SDCP infrastructure 110 this data can be provided by the testing environment while simulating the payment media. In specific embodiments, the testing environment can utilize simulated payment media for this purpose.

The outputs from a payment solution including a payment media kernel can take on various forms depending upon the payment media kernel that is being tested. In general, a payment solution is a state machine that is systematic and predictable such that in any given state, a series of inputs will always generate the same outputs whatever the deployment context of the solution. However, different payment solutions in accordance with this disclosure can have different functionality such that their outputs can be different. As an output, an EMV kernel provides all the information required and generated during the exchanges performed with the payment media so that the payment applications can request a valid payment authorization to the issuing bank corresponding to the payment media. The outputs include a terminal verification result, an EMV dashboard (i.e., a bitmap reflecting events that may have occurred during the transaction), unpredictable random numbers which are generated to guarantee the uniqueness of a transaction, a certificate (e.g., an AES or 3DES based cryptogram indicating whether the payment media was accepted by the issuer, declined, or a request to go online to perform the transaction), an indicator of the payment media holder verification method (e.g., pin, signature, phone, none, etc.), production data depicting what has happened during a transaction and how, and commands that the kernel sends to collect issuer data objects from the payment media. In deployment, all these outputs will be provided either up the payment stack or back down towards the payment media and may be responded to accordingly to continue the transaction. However, the responses from either above or below in the payment stack are required to follow standardized procedures which are known and can therefore be simulated with accuracy by the testing environment. Accordingly, all these outputs can either be reacted to by the testing environment and/or stored as an output to the SDCP infrastructure 110 along with metrics 115 that are produced by the SDCP infrastructure 110 as will be described below.

The output of the SDCP infrastructure 110 can include an executable 113 for source code file 111. The executable 113 can be delivered to, installed on, and executed by a given hardware environment to implement the payment solution defined by source code file 111 in a payment system. Depending upon the implementation, the executable can be a candidate executable, qualified executable, packaged executable, or production executable as those terms are defined with reference to FIG. 2 below. In particular, the executable can be a production executable in the form of a software system that is packaged for installation and execution according to a given platform (e.g., the executable can be an Android package .apk file) that can be used on that given platform. Executable 113 can be a certified payment solution which SDCP infrastructure 110 has tested for compliance with a certification authority's requirements such as a payment network requirement for a payment solution or a payment media requirement for a payment media kernel (e.g., the EMVCo requirements). The executable can be generated by a software binaries generator such as binaries generator 201, or any of the subsequent blocks in the diagram that generate qualified executable 214, packaged executable 215, or production executable 213.

The executables that are under test in the SDCP infrastructure 110 can output metric 115 for the performance of the payment solution defined by source code file 111. The outputs can be interpreted by the SDCP infrastructure 110 because of the execution of the system under test (i.e., the executable). The metrics can be the product of a system under test's execution following a trigger and a sequence of exchanges with a simulated hardware in a test environment of the SDCP infrastructure 110. The metric can be a set of normalized information along with metadata that are machine readable. Transactional metrics can be edited, parsed, analyzed, and compared. Metrics 115 can provide a formal way to describe an EMV acceptance state and a set of transitions that led to this state. Metrics 115 can include a transaction descriptor with a name, data source, software version, etc. Metrics 115 can include output signals from a test of the payment solution such as those described above regarding the output of a Level 2 EMV kernel with metadata (e.g., a string of values: df 81 29 08 40 f0 f0 f0 90 f0 ff 00) or a textual representation of the output such as the following.

```
outcome: 40 (END APPLICATION)
start: f0 (N/A)
online response data: f0 (N/A)
cvm: f0 (N/A)
UI request on outcome present: 1
UI request on restart present: 0
DR present: 0
DD present: 1
receipt: 0
alternate interface: f0 (N/A)
field off request: ff
removal timeout: 0
```

The metrics can also include message signals such as user interface request data per the EMVCo specifications. Again, these outputs can be provided in the form of metadata (e.g., a string of values df 81 16 0d 1c 00 00 00 00 00 00 00 00 00 00 00 00) or a textual representation such as the following.

message identifier: 1c (INSERT, SWIPE, OR TRY ANOTHER CARD)
status: 00 (NOT READY)
holdtime: 000000
language preference: 0000000000000000

The metrics can also include EMV data objects (e.g., alias EMV tags), EMV configuration descriptions, time frames showing the time spent in a critical section of the transaction, card references that were used to perform the transaction, and other data.

Another output of an SDCP infrastructure, such as SDCP infrastructure 110, can be proof of trust 116. The proof of trust can certify the integrity of an executable produced by the SDCP infrastructure 110. The integrity of the executable can then be used to assure that a given executable has been certified by a certification authority such as EMVCo. For example, the proof of trust can be a certificate generated using the executable and signed by the SDCP infrastructure 110 to certify that a given executable has been tested by a certification authority and is compliant. The executable can be sent to the external certification authority's auditing system via a secure connection for purposes of obtaining that certification. Subsequently, payment system implementers that would like to integrate a given certified executable into their payment hardware can access the proof of trust and conduct a cryptographic routine on the executable and certificate to determine that the executable has not been tampered with and is the version of the payment solution that has been certified by the certification authority. The proof of trust can be issued in coordination with an external certification authority that confirms a given executable is acceptable. In alternative embodiments, a testing environment within the SDCP infrastructure 110 can itself be certified by a certification authority which can allow the SDCP to independently certify that a given executable meets the standards of the certification authority. In these embodiments, the SDCP infrastructure 110 can generate the proof of trust internally without coordination with an external entity.

In specific embodiments of the invention, the proof of trust, such as proof of trust 116 can be a blockchain that is altered by the activities of the SDCP infrastructure 110. For example, the blockchain can be altered by the actions of the binaries generator 201, a testing environment (e.g. virtual lab testing block 202), and the security block 203. The actions of each of these modules can result in the minting of transactions on a blockchain ledger so it is possible for compliance authorities to track the history of a deployed payment solution 204 that is deployed in a payment system (e.g., an EMV card processing environment). The actions of each of the modules described above can generate a block for the blockchain. All the blocks can be linked sequentially so that a compliance authority can determine when, how, and who produced the payment solution that is used in each payment transaction in a payment system. In terms of format, the proof of trust can include data depending on the activity, a specific record logging all the information related to the build, compilation, software versions, computers, test report reference, etc. for a given executable. The proof of trust 116 can also include a previous hash generated by the previous action of one of the modules and a hash generated by the current action of the module to link them together on the chain. As will be described, during the securing process executed by security block 203, a cryptographic certificate can be computed from the executable and be associated with the blockchain at the time of the third transaction with the ledger. In specific embodiments of the invention, the SCDP infrastructure maintains the blockchain only for the versions of the executable that are deployed while candidate executables and qualified executables are not tracked because they are part of an iterative process that will ultimately lead to a deployed version.

FIG. 2 provides a flow chart of the operation of a specific implementation of an SDCP infrastructure in accordance with specific embodiments of the inventions disclosed herein. The blocks that are not surrounded by dotted lines are part of the SDCP infrastructure, the blocks surrounded by dotted lines are external entities. The illustrated SDCP infrastructure process can support certified payment media processing (e.g., EMV contact and contactless card processing) for different secure hardware brands by producing and certifying a single generic payment solution that can be certified for and deployed on those various hardware systems. The blocks labeled "back-office-process" refer to processes and steps that are not visible to the users of the SDCP and the external entities that interface with the SDCP infrastructure. As will be described, the SDCP infrastructure can include various components including a software binaries generator, a testing environment, a security module, a development environment, a data collection module, and an EMV analysis module.

The SDCP infrastructure process illustrated by FIG. 2 begins with the generation of a candidate executable 211. The process utilizes an abstract code base 212. The abstract code base 212 can be a container. The container can store all the input source code required to generate a production executable 213 that is ready for deployment and that implements the payment solution functionality described by source code file 111. The process utilizes a source code file such as source code file 111. Binaries generator 201 utilizes the source code file to generate a candidate executable 211 in a software generation process.

Using the illustrated approach, source code file 111 can be generated in such a manner that it is agnostic to specific platform SDKs. This provides significant benefits as a software developer can design a single payment solution that will function across hardware environments while the SDCP infrastructure provides the hooks for the payment solution to work with various hardware environments automatically. As will be described below, the generated binaries can be configured to operate with an abstract hardware platform and the abstract hardware platform can be simulated by the testing environment of the SDCP. The abstract hardware platform can abstract away all the idiosyncrasies of specific hardware environments. As such, the payment solution that is tested using the SDCP can be certified for operation with any hardware environment. Additionally, as will be described below the SDCP can format the payment solution for operation in a given hardware environment automatically by adding the required hooks from the payment solution to the hardware SDK or API when preparing the executable for deployment.

As illustrated, candidate executable 211 can be a stand-alone executable binary implementing a payment solution for running on a generic platform such as a PC-based system to test the software system in a virtualized environment. The candidate executable can also be a payment solution running on a docker. The required software systems necessary to enable the executable to operate in a selected hardware environment can already be included in candidate executable 211 or they can be added later. In the illustrated case, the required software can be added from a library of hardware information 210 in a security block 203 when generating packaged executable 215. Packaged executable 215 can be generated for a selected hardware environment which is described by information in library of hardware information 210.

Figure 3:
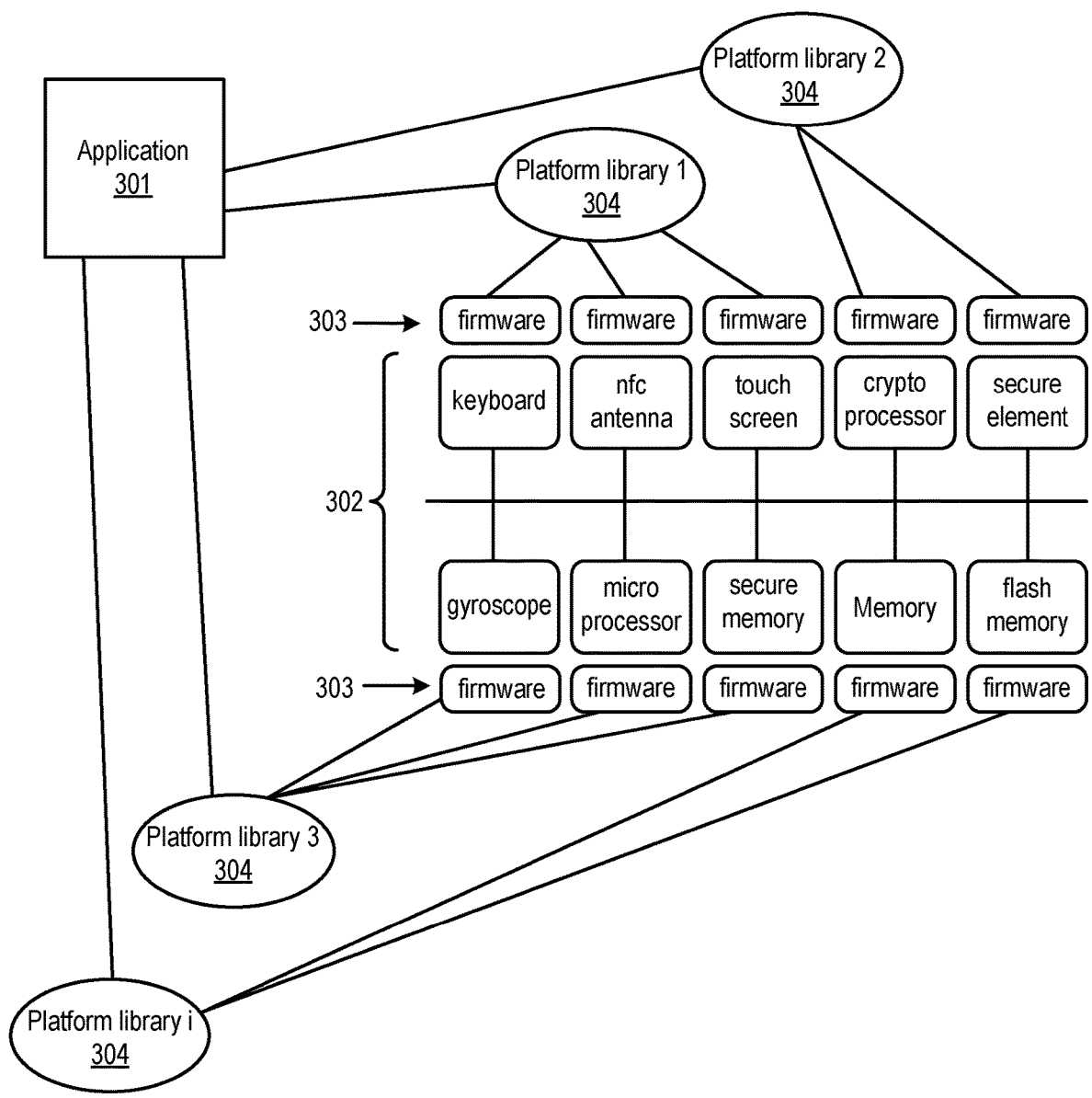
FIG. 3 provides a block diagram illustrating the functionality of platform information that can be stored in the library of hardware platform information from FIG. 2 in accordance with specific embodiments of the inventions disclosed herein.

FIG. 3 provides a block diagram illustrating the functionality of the hardware system information that can be stored in library of hardware information 210 in accordance with specific embodiments of the inventions disclosed herein. The hardware system information can be an SDK. The information, such as a platform SDK, can be provided by a hardware manufacturer like Google, Sunmi, PAX, etc. The information can allow software developers to utilize the manufactured hardware (e.g., a terminal or mobile phone) to implement a payment system. The hardware system information can be delivered through a set of APIs and libraries along with documentation to assist in the integration thereof with a payment solution being developed for and dependent on an associated hardware environment. As illustrated, the information in the library of hardware information 210 can allow for the development of an application 301 without having to deal directly with the complexity related to hardware components 302 and firmware 303. The hardware components can be designed to interface with payment media (e.g., an NFC antenna) or they could receive payment information directly from a user (e.g., a touch screen) such that the payment media was part of the hardware components themselves (e.g., the electrical signals that process the touch inputs on the touch screen). The hardware system information disclosed herein can be a set of specific software libraries 304 where each library allows the digital world to control and receive information from the analog front ends thereof. The libraries allow payment solutions to manage user interfaces, cryptographic keys, NFC card interfaces memories, and any other payment information media. The libraries can use granular components such as firmware 303 to exchange inputs and outputs with the hardware components 302. In specific embodiments, a given payment solution will be designed to operate with one or more hardware components such that one or more libraries may be needed to produce a testable or deployable executable for the payment solution. In specific embodiments, a given payment solution will be designed to operate with multiple hardware components and may need to be certified with many potential hardware environments.

As stated previously, binaries generator 201 can utilize an abstract code base 212 to produce candidate executable 211. A software developer can access abstract code base 212 to generate the code required for source code file 111 either through an IDE of the SDCP infrastructure 110 or otherwise. The abstract code base can be a container that stores source code, toolchains, scripted tasks and activities, and documentation. The abstract code base can receive source code, Makefiles, scripts, Docker images used for the execution environment, and other artifacts that are contributed by developers of the SDCP infrastructure 110. The abstract code base can then be accessed for formatted source code, code metrics, and online documentation. The abstract code base can be instantiated by a code base management system such as Gitlab. The abstract code base can store source code for a payment solution. The payment solution can include a payment media kernel such as an EMV Level 2 kernel. The abstract code base can store all the scripts used for generating an executable. The scripts can correspond to tasks and activities such as code formatting, code analysis, automatic documentation, and other artifacts stored as Docker images. The scripts in the abstract code base can be executed in sequence. The abstract code base can use .yml scripts for formatting. The abstract code base can use markup languages to produce html pages for the documentation.

Figure 4:
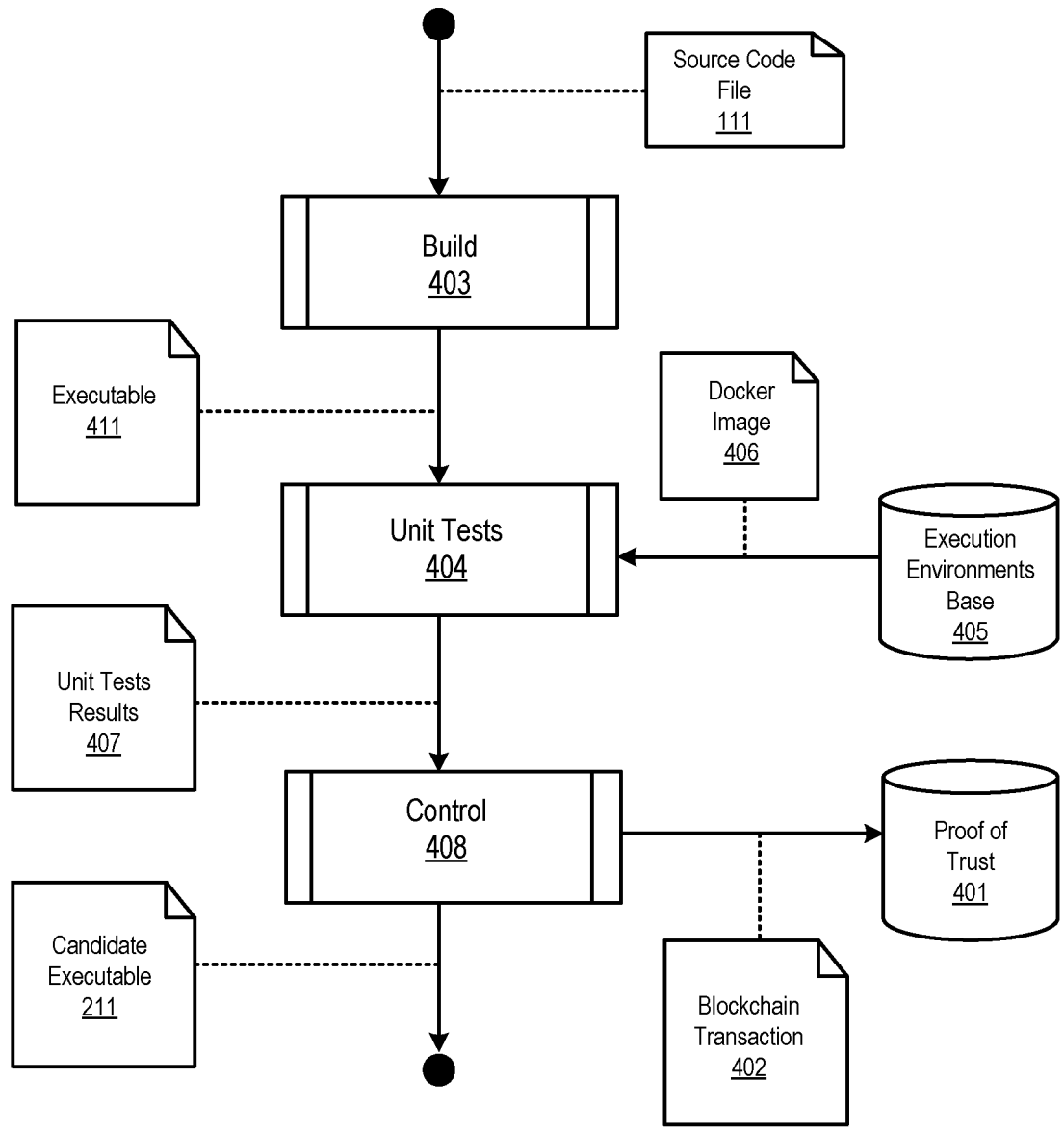
FIG. 4 provides a block diagram illustrating the functionality of a binaries generator in accordance with specific embodiments of the inventions disclosed herein.

FIG. 4 provides a block diagram illustrating the functionality of a binaries generator in accordance with specific embodiments of the inventions disclosed herein. The block diagram can represent the functionality of binaries generator 201. The block diagram includes a proof of trust 401 which can be updated by a binaries generator, such as binaries generator 201, in the production of an executable. One of several activities conducted by the SDCP infrastructure can be to provide the proof of trust for a payment solution tested by the SDCP infrastructure to an external certification authority as is illustrated. The elements of the block diagram can be implemented by a set of scripts that can be executed through a CLI or programmatically. The binaries generator can be a code compiler and linker. Additionally, the binaries generator can run virtual images to deploy generated binaries and perform unit tests. If the unit tests fail, then the generation process can be blocked until human intervention is detected. Otherwise, if the unit tests pass, a generated binary can be promoted as a candidate executable. The binaries generator takes in an input source code, such as source code file 111, and generates a candidate executable, such as candidate executable 211. The input source code can be formatted source code with Makefiles, target toolchains, and Docker images. The output of the binaries generator can be a candidate executable, such as candidate executable 211, which will provide the services of a desired payment solution to a payment system on which it is installed. In specific embodiments, the generation of a candidate executable such as candidate executable 211 can be accompanied by a blockchain transaction 402 recording information regarding the candidate executable on a blockchain as represented by proof of trust 401.

The block diagram in FIG. 4 includes a build block 403. The build block generates an executable that can be deployed in a simulation in order to be tested in a virtual hardware environment. The build block can be instantiated by a set of commands that are executed via scripts. A build block, such as build block 403, can use several principles to generate an executable. As an input, the build block can take in a Makefile that contains several options that are activated or deactivated depending upon an objective that has been programmed into the build block. The options are a debug mode, certification mode, a verbose mode, and a unit test. Based on these options, an executable for an executable, such as executable 411, can be generated for execution on a simulated virtual hardware environment. The simulated virtual hardware environment can abstract away the hardware platform interface in order to allow for testing of the candidate executable 211 independently of the hardware system in which the executable will ultimately be deployed. The output of the build block 403 can also include build logs for debugging and data collection purposes.

The block diagram in FIG. 4 also includes a unit test block 404. The unit test block 404 is responsible for conducting unit tests on the candidate executable 411. The unit test block 404 can conduct this action with access to an execution environment database 405 which includes details regarding the operation of different hardware environments and how to simulate their interaction with the payment solution implemented by an executable from build block 403. The inputs to the unit test block can be an executable, such as executable 411, and a Docker image 406. The output of the unit test block can be the unit test results 407. The unit test block can perform a series of granular tests on the executable to analyze potential regressions. The unit test block can run unit tests based on a unit library and source code associated with the executable. For example, if the source code were written in C++ the selected unit library could be the Google Unit C++ Library. The unit tests could compare the outcomes of primitive calls against the executable to an outcome that is expected. The unit tests could include positive test cases and positive false test cases.

The block diagram in FIG. 4 also includes a control block 408. The control block 408 is configured to generate an output for the proof of trust after receiving unit test results 407 which indicate that the executable 411 passed the unit tests. As stated previously, the output could be the minting of an entry on a blockchain which could be administrated by a control block such as control block 408. Another output of the control block is a candidate executable, such as candidate executable 211. Control block 408 can be instantiated by a set of commands that are executed via scripts. The control block 408 can check the unit tests result and block subsequent steps if the unit test results show a regression. Ultimately, control block 408 can also write a record into a proof of trust ledger to track that the software was actually tested ahead of qualification and securing stages. The unit test result can be a data structure that lists PASS and FAIL tests. The proof of trust record can be a blockchain entry that tracks, the control process utilized (e.g., name, version, date, time), the outcome of the unit tests, and a certificate corresponding to the control process record in the form of a hash.

The flow chart in FIG. 2 continues with the actions of a virtual lab testing block 202 of testing payment solutions which are described by candidate executables such as candidate executable 211. The payment solutions can have payment media kernels such as EMV Level 2 kernels integrated into the candidate executable. The testing can be conducted by a virtual laboratory using compliance test plans to simulate the candidate executable in a simulated hardware environment. The virtual laboratory can provide a testing environment in which the candidate executable 211 can be applied against a simulated hardware environment that is agnostic to any specific real world hardware environment. The simulated hardware environment can include an abstract hardware platform that isolates the candidate executable from requirements for any specific real world hardware environment such as requirements to interface with the API of a specific type of payment media or specific proprietary payment hardware. The output of virtual lab testing block 202 of testing payment solutions which are described by candidate executables is a qualified executable such as qualified executable 214. A qualified executable is a software system in the form of a standalone executable binary which describes the functionality of a payment solution and which targets a test environment such as a PC based system in order to test the payment solution in a virtualized environment. The qualified executable is presented by the test environment once it has passed the functional tests of the test environment with success.

Figure 5:
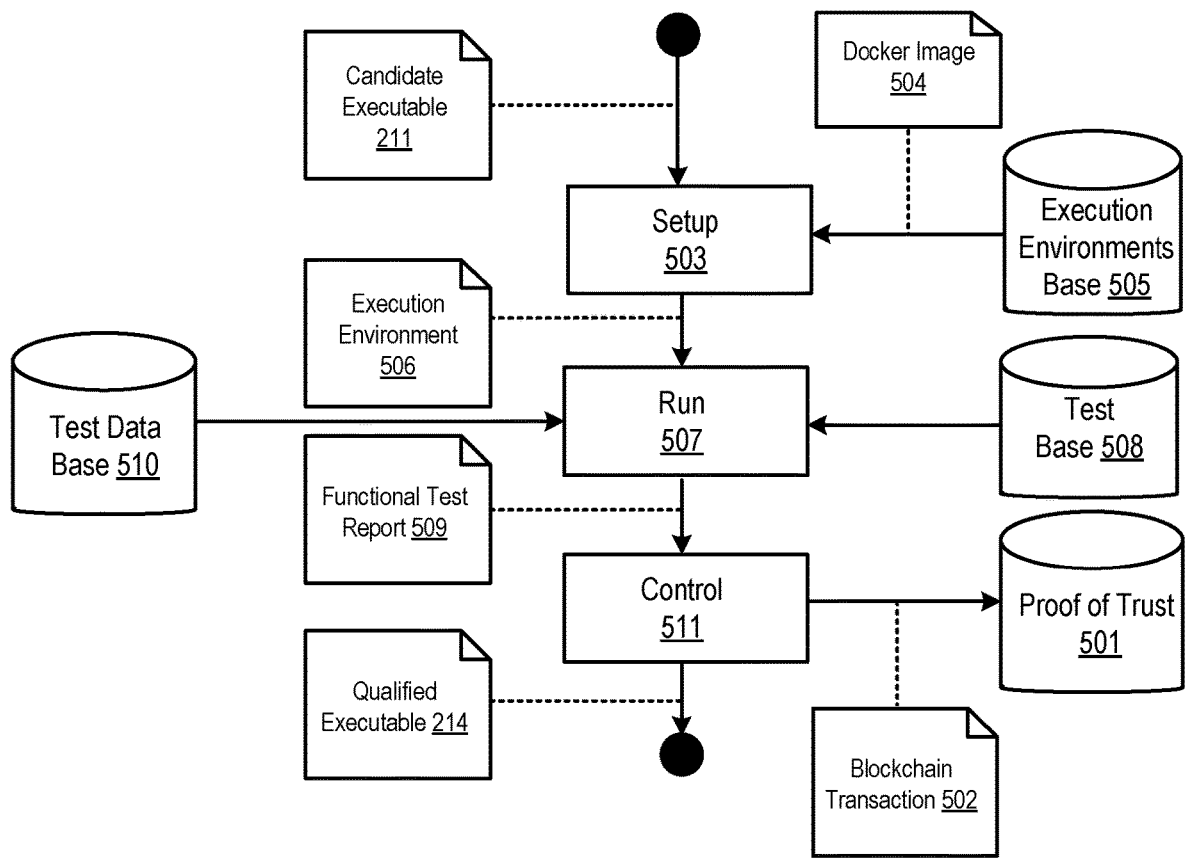
FIG. 5 provides a block diagram illustrating the functionality of a virtual lab testing block with a testing environment in accordance with specific embodiments of the inventions disclosed herein.

FIG. 5 provides a block diagram illustrating the functionality of a virtual lab testing block with a testing environment in accordance with specific embodiments of the inventions disclosed herein. The block diagram can represent the functionality of virtual lab testing block 202. The block diagram includes a proof of trust 501 that can be updated by the virtual lab testing block, such as virtual lab testing block 202, in that the testing of an executable can be one of several activities conducted by the SDCP infrastructure that is recorded in the proof of trust for a payment solution developed by the SDCP infrastructure. The elements of the block diagram can be implemented by a set of scripts that can be executed through a CLI or programmatically. A virtual lab testing block, such as virtual lab testing block 202, can process and execute certification plans from a certification authority in preparation of certification sessions (at an actual laboratory). In alternative embodiments, the virtual lab testing block 202 itself can be certified by a certification authority and serve to certify executables that are evaluated and pass the certification tests. A virtual lab testing block can also perform non-regression testing and additional tests not defined by certification authorities. Upon determining that the executable would pass the certification tests, the virtual lab testing block 202 can output a qualified executable such as qualified executable 214. In specific embodiments, the generation of a qualified executable, such as qualified executable 214 can be accompanied by a blockchain transaction 502 recording information regarding the candidate executable on a blockchain in place of proof of trust 501.

A virtual lab testing block, such as virtual lab testing block 202, can take in as an input a candidate executable and can output a qualified executable. The qualified executable can be an instance of the payment solution that is ready for deployment and is expected to be certified by a certification authority if evaluated. The virtual lab testing block can be implemented as an orchestrator. The virtual lab testing block simulates the candidate executable in a virtualized environment and runs a test plan that includes a list of functional test cases. Each test case can be a combination of pre-conditions, post-conditions, trigger events, expected results, and virtual payment media such as a virtual card. The test cases can include payor interactions such as PIN entry, application selection, general cardholder interactions, etc. At the end, the virtual lab testing block can compare post-conditions to expected results and performs a final verdict on whether or not the executable is expected to be certified if tested by a certification authority. The virtual lab testing block can run these simulations in a testing environment. The same testing environment can be used to run tests for test and analysis block 205 as will be described below with the exception that the test and analysis block 205 utilizes production data as opposed to virtual test data and with the exception that the test and analysis block 205 is not used to determine certification for the payment solution but is instead used for debugging purposes.

The orchestrator of the virtual lab testing block can interact with the candidate executable like a primary and secondary actor would (e.g., a payment gateway, POS, or hardware environment). In this manner, the transactional paradigm is not broken when shifting from a test environment toward a production environment. As such, setting pre-conditions for the test environment can consist of setting the payment solution environment (e.g., the certificate authority public key (CAPK), acquirors configuration, BIN list, etc.). Then, the orchestrator can trigger test case consisting of actions such as performing a payment transaction. The orchestrator can then obtain the post-conditions by fetching the data produced during the transaction. At the end of a test, the orchestrator can conduct a comparison between the test outcome and an expected result that is known to the testing environment. The virtual lab block can iterate on all tests to ultimately provide a functional test report where each test is qualified (e.g., classified using a pass, fail, or undefined classification system).

The flow chart of FIG. 5 includes setup step 503. Setup step 503 can prepare a virtual machine and virtually deploy a candidate executable in the virtual machine for purposes of simulating the candidate executable. The step can be instantiated in the form of scripts. The input to the step can be a candidate executable and a Docker image 504 taken from an execution environments database 505. The different execution environments can be used to instantiate different virtual machines and can be stored in a repository. The virtual machines can correspond to different PC based environments (e.g., Windows, Linux, iOS, etc.). The virtual machine can be programmatically mounted and can own a specific IP access with SSH access. The executable can be installed and executed from that access such that it is ready to be tested. The virtual machine and execution environments can provide a simulation environment that is agnostic to specific hardware environments in which a payment solution is to be deployed as described above. The output of the setup step can be an execution environment 506.

The flow chart of FIG. 5 includes a run step 507. The input to the run step 507 can be an up and running POI and a test plan from a test database 508. The outputs to the run step 507 can be a functional test report 509. The test database 508 can store all the test inputs and configuration information required to certify a payment solution with a certification authority. The input to the run step 507 can also be test data from a test data database 510. The test data can include a database of virtual payment information such as virtual cards that can be used in simulations of the payment solution by the testing environment. The run step and testing environment can be instantiated as a virtual hardware application that runs like a back-office process and interacts with a candidate executable that plays the role of a POI. The virtual payment processing hardware system used in run step 507 can use the database of virtual payment information. The testing environment can iterate on a test plan and execute each test against the candidate executable like a payment transaction.

The test data can be a series of groups of data that are used in different tests or different simulated transactions which are part of those tests. The test data can include virtual payment information like virtual cards, EMV configuration data, and metrics such as EMV transaction descriptors, EMV signals, and EMV data objects. The groups of data can integrate metadata such as software versions, hash codes, the source of the data, etc.

The testing environment that is instantiated in the virtual lab testing block can execute an executable with a virtual payment processing hardware system in a set of simulations. The tests of a given executable can be run during a single test in a single virtual machine (e.g., testing a candidate executable that is designed to operate with more than one hardware system like chip cards and finger-print scanners). The virtual payment processing hardware systems can include at least two virtual payment media (e.g., one system can include a virtual chip card and another system can include a virtual magnetic stripe). The output of the run step 507 can be a functional test report 509 which confirms if the candidate executable 211 properly executed the tests in the simulated hardware environment or environments.

The block diagram in FIG. 5 also includes a control block 511. The control block is configured to generate an output for the proof of trust after receiving functional test report 509 which indicates that the candidate executable 211 passed the functional tests. As stated previously, the output could be the minting of an entry on a blockchain which could be administrated by a control block such as control block 511. Another output of the control block is a qualified executable, such as qualified executable 214. Control block 511 can be instantiated by a set of commands that are executed via scripts and that follow the scripts executed by the run step 507. Control block 511 can check the functional test report and block subsequent steps if the functional test report shows a failure or other error. Ultimately, control block 511 can also write a record into a proof of trust ledger to track that the software has been confirmed valid for qualification, or qualified, ahead of the securing stage. The proof of trust record can be a blockchain entry that tracks the control process utilized (e.g., name, version, date, time), the outcome of the functional tests, and a certificate corresponding to the control process record in the form of a hash.

Security block 203 can serve to secure and promote the qualified executable to production by providing a proof of trust output to a proof of trust required by compliance authorities to identify deployed binaries. The input to security block 203 can be the qualified executable 214. The proof of trust can be proof of trust 116 and the proof of trust output can be blockchain output 216. In these embodiments, the proof of trust can be a blockchain entry on a blockchain and providing the proof of trust for the executable to the external compliance authority can comprise minting the blockchain entry on the blockchain. The secured output can be a packaged executable 215. In specific embodiments, the packaged executable can be used to mint the entry on the blockchain such that the packaged executable can be cryptographically authenticated via access to the blockchain entry. The packaged executable can be a software system in the form of a library targeting a specific platform system to deploy it. The packaged executable can be secured and authenticated such as via access to the proof of trust. The compliance authority 206 can be an organization external to the SCDP and external to the organization that administrates the SCDP. The compliance authority can certify portions of the payment solution such as EMV Level 2 kernels in embodiments in which the payment solution includes an EMV Level 2 kernel. The compliance authority can be concerned with making sure that what is certified at their laboratories is the same as what is deployed in the field. The proof of trust mechanism integrated into the SCDP infrastructure can address this concern by distinctly linking certain executables with an authenticated verifiable identification thereof.

Figure 6:
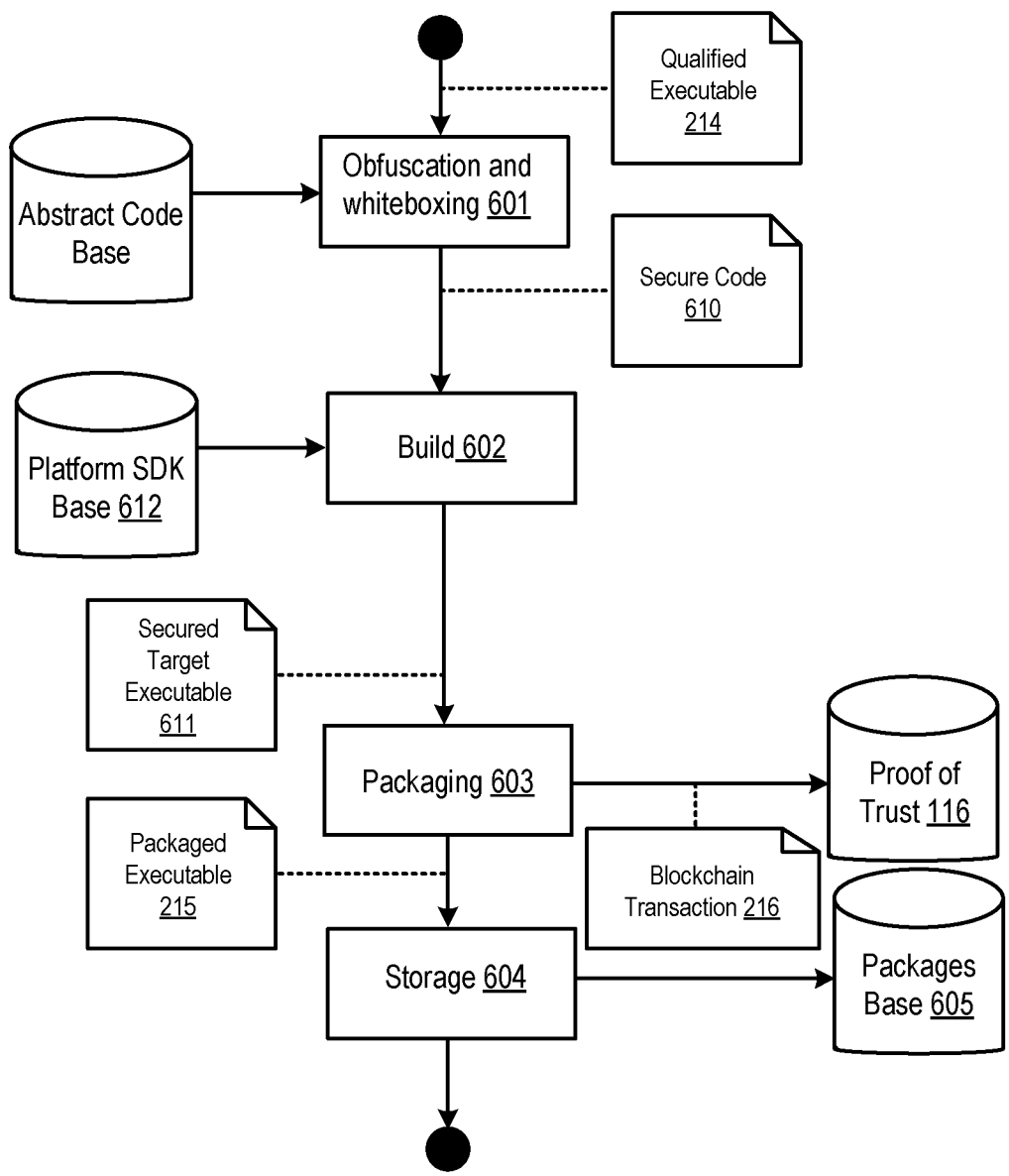
FIG. 6 provides a block diagram illustrating the functionality of a security block in accordance with specific embodiments of the inventions disclosed herein.

FIG. 6 provides a block diagram illustrating the functionality of a security block, such as security block 203, in accordance with specific embodiments of the inventions disclosed herein. The security block can generate a packaged executable ready to be delivered for deployment. The security block can obfuscate the code, if required for a given hardware environment, build the final executable for a given hardware environment, and store the package for delivery. The process can be tracked using a proof of trust by involving a proof of trust output when the package has been secured for storage. The input to security block 203 can be a qualified executable, formatted source code, a Makefile, and a Toolchain. The outputs can be build logs, a packaged executable (e.g., a .apk file), and a proof of trust output that can result in a blockchain entry on a blockchain proof of trust ledger. The security block can be instantiated as a series of scripts and an integration onto an obfuscation or whitebox tool. The security block can generate a final executable that will be deployed in the field. Optionally, the security block can integrate a task that consists in protecting the code for the runtime execution. Ultimately, it can generate a package that is backed up and ready pushed to the delivery stage. The security block operates similarly to the compilation tasks mentioned above. Depending on the objectives, obfuscation or white-boxing can be conducted on source code or a binary. For that purpose, the security block can use a specific tool that requires parameters provided through a Makefile. The security block can conduct the final steps before releasing the payment solution for deployment so everything can be backed up to be able to trace the packaged executable.

FIG. 6 includes an obfuscation and white boxing step 601 that may be required in certain implementations depending upon the hardware environment in which the payment solution will be deployed. The inputs to the process can include formatted source code, a makefile, and a toolchain. The outputs to the process can be secure code such as secure code 610. The step can be instantiated by scripts and an obfuscation or white boxing tool. The step modifies the source code and/or the binary such that it cannot be reverse engineered even if it is executed in an unsecured environment. Certain hardware environments may require this step since cryptographic keys and procedures, or other proprietary information may be involved in implementing a payment solution on those hardware environments. Examples of the modifications include blurring the source code by renaming function, or variable names, or adding complexity to the structure of the code. Further examples include modifying the paths of executions and protecting sensible data or algorithms with white boxes (i.e., protection against attacks like side channels analysis, reverse engineering, or fault injection). The security block can work like a compiler. This step is mandatory for MPOC systems and when required to get rid of hardware security issues that create dependencies. The secure code 610 satisfies these requirements in those embodiments.

FIG. 6 includes a build block 602, a packaging block 603, and a storage block 604 which all serve to finalize packages for deployment from the SCDP infrastructure. The input to build block 602 can be secure code 610 and the output of build block 602 can be secured target executable 611 which can be a package (e.g., a .apk file). The input to build block can also be platform information such as from platform SDK database 612. The platform SDK database 612 can be part of the library of hardware information 210. The build block 602 can format the executable for operation with and deployment in a specific payment hardware system. The information regarding the hardware system can be, for example, an Android API, Sunmi SDK, PAX SDK, or any platform SDK or API. The SDK can be a set of libraries and an API for a hardware system that can be used by a payment solution to implement the functionality of the payment solution in a given hardware environment. The output of the block can be a package for a specific hardware environment such as an Android package that can be deployed on a physical instantiation of that specific hardware environment in order to be integrated by a payment system implementer into a payment system. Packaging block 603 can take the secured target executable 611 as an input and output a packaged executable 215 and a blockchain output 216. Packaging block 603 can be instantiated by a set of scripts. Packaging block 603 can prepare a package (e.g., an Android package) with all the information required to maintain the package (e.g., metadata). The metadata can correspond to all the information required to maintain the package. The blockchain output 216 can be used in a blockchain transaction to add an identification of the packaging process (e.g., name, version, date, and time), an outcome of the build process, and a certificate corresponding to the package to the blockchain. Storage block 604 can store the package in packages database 605 to be stored for deployment later. In the future, payment implementers can then select packages from packages database 605 that have been certified by a certification authority and that are designed to operate with a hardware environment that matches the one the implementers are utilizing for their payment system.

Delivery block 207 can be used for provisioning and deploying packages for external payment systems. Delivery block 207 can take a packaged executable such as packaged executable 215 as an input and output production executables such as production executable 213. A production executable can be a software system in the form of a package (e.g., an Android package .apk file) that can be used in a hardware environment corresponding to the SDK or other hardware environment information that was used by the binaries generator 201 and the hardware environment that determined the configuration of security block 203.

Figure 7:
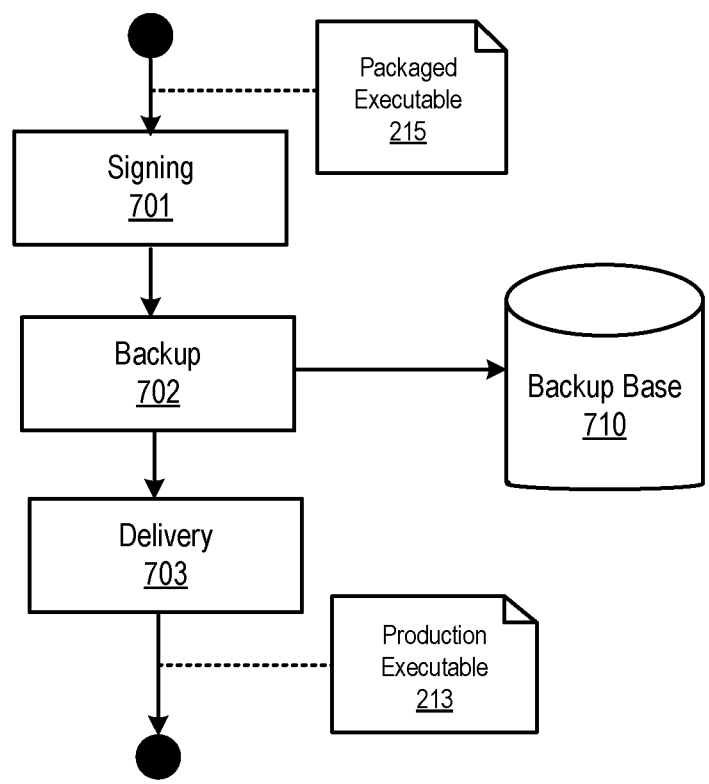
FIG. 7 provides a block diagram illustrating the functionality of a delivery block in accordance with specific embodiments of the inventions disclosed herein.

FIG. 7 provides a block diagram illustrating the functionality of a delivery block, such as delivery block 207, in accordance with specific embodiments of the inventions disclosed herein. The delivery block can take in a packaged executable such as packaged executable 215 and produce a production executable such as production executable 213. The delivery block can be implemented as a system that backs up and pushes all production executables so payment system implementers and other customers of the organization that administrates the SCDP infrastructure can securely integrate payment solutions developed by and stored in the SCDP infrastructure into their payment application. The input to delivery block 207 can be a packaged executable such as packaged executable 215. The output from the delivery block 207 can be a production executable such as production executable 213. The delivery block can be instantiated as a process that waits for incoming requests to trigger its tasks. The tasks can be implemented as a set of scripts. Delivery block 207 can prepare downloadable packages for payment system implementers or other customers of the organization that administrates the SCDP infrastructure. The delivery block 207 can pull files from a database and send them through a network to an external delivery location for deployment.

FIG. 7 includes a signing block 701. The input to signing block 701 can be a packaged executable such as packaged executable 215. The output of signing block 701 can be a signed packaged executable. The signing block can be implemented as a cryptographic task in the form of libraries and scripts that are able to generate a cryptographic signature for the packaged executable using the data of the packaged executable and a private key. The singing block can use cryptographic algorithms such as AES, RSA, DES, 3DES, Blowfish, Twofish, RC4, SHA-256, MD5, SHA-3, ECC, and DSA. The signing block can sign the package received from the securing block, so that the package can be authenticated when it is downloaded by a payment system implementer. This mechanism is used to validate that the package comes from the administrator of the SCDP and has not been tampered with.

FIG. 7 also includes a backup block 702. The backup block 702 can be responsible for storing backup copies for the signed packages in a backup database 710 for later access by payment system implementers either when they first download the package or when they need a backup copy of the package. The backup block 702 can store the signed packages in a repository along with its metadata. The backup block 702 can use a scalable object storage service to store and retrieve the data from backup database 710. The scalable object storage service could be MS Azure Blob Storage, Google Cloud Storage, IBM Cloud Object Storage, Alibaba Cloud OSS, DigitalOcean Spaces, or Amazon AWS S3. FIG. 7 also includes a delivery block 703. The delivery block can deliver packages from the backup database 710 to payment system implementers. The delivery block can be a task that posts the packages in a directory for delivery. The delivery block can drop the package in a directory so it can be downloaded by a payment system implementer. The delivery block can use the same scalable object storage as the backup block 702 to access and move the data and it can use metadata from the packages to direct the package to the appropriate directory for a given payment system implementer.

Deployed payment solution 204 is external to the SCDP infrastructure and represents the execution of payment transactions by a payment solution that has been deployed from delivery block 207 in the form of a production executable 213 for integration into a payment system. The actions of the deployed payment solution can be referred to as production activities. These production activities can result in the creation of production data 217. This production data can be collected by a data collection system 208 and turned into test data 218. This test data can then be provided to a test and analysis block 205 which can either simply review the test data to evaluate the performance of a deployed payment solution, or it can use the test data to analyze the performance of a payment solution that is currently under development. The test data can be machine readable data. Regardless, the test and analysis block 205 can generate fixes guidance 219 to allow a software developer to modify and improve the payment solutions that are under development within the SDCP infrastructure or deployed from the SDCP. Further details on the behaviors of deployed payment solution 204, data collection system 208, and test and analysis block 205 are provided below.

While not illustrated in FIG. 2, numerous shorts in the flow illustrated by FIG. 2 can be provided to provide additional functionality in specific embodiments of the SDCP infrastructure. For example, test data 218 can also be used in the testing environment of the virtual lab testing block 202 for the functional testing of executables that are going through analysis for certification. As another example, the test and analysis block can be used on outputs generated by executables that are undergoing simulation in the testing environment of the virtual lab testing block 202 to obtain fixes guidance 219 for executables that have not yet been deployed.

Figure 8:
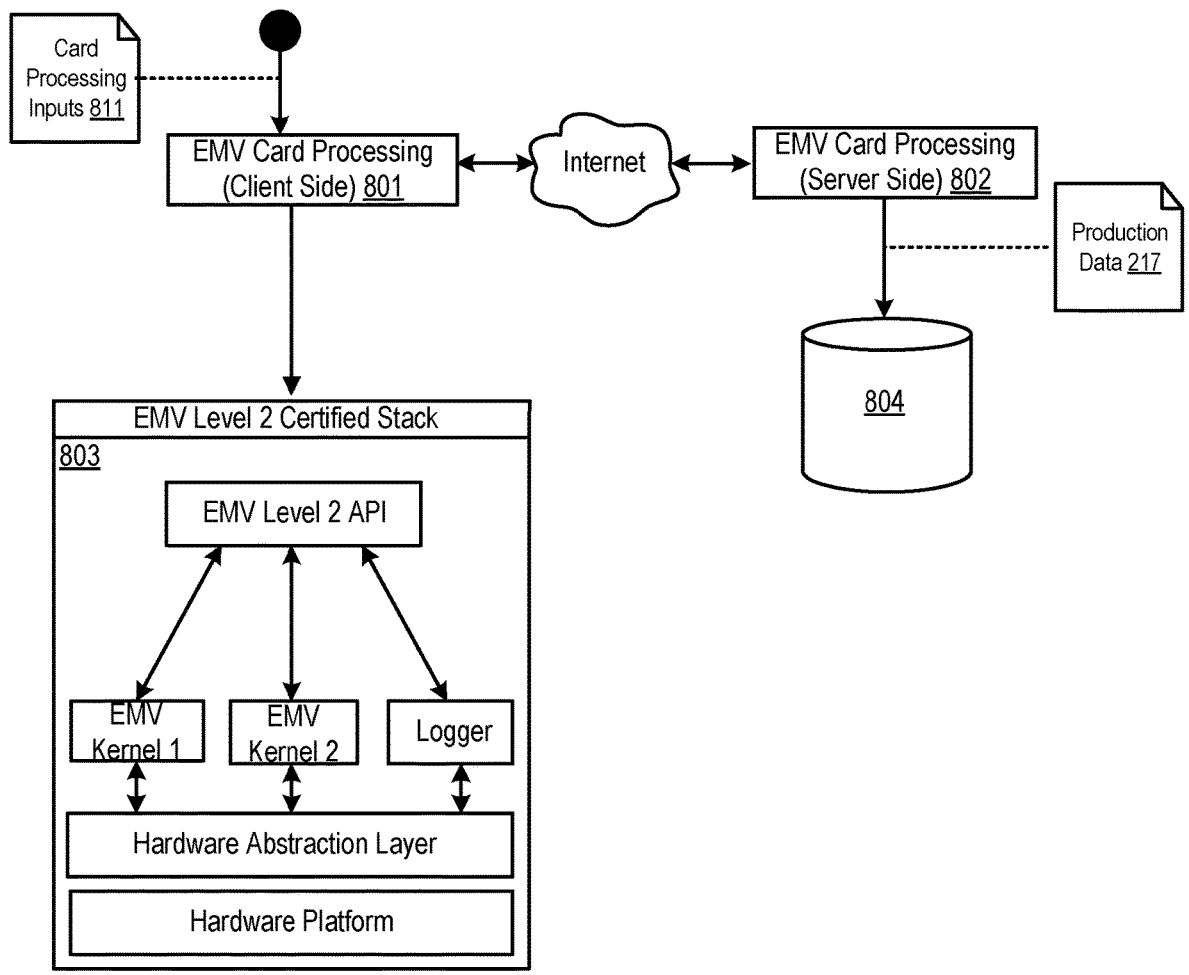
FIG. 8 provides a block diagram of a deployed payment solution engaging in production activities by processing payment cards and generating production data in accordance with specific embodiments of the inventions disclosed herein.

FIG. 8 provides a block diagram of a deployed payment solution engaging in production activities by processing payment transactions and generating production data in accordance with specific embodiments of the inventions disclosed herein. In FIG. 8, the deployed payment solution can be described by production executable 213 and the production data can be production data 217. The production executable 213 can include a client-side portion of a payment processing system 801 and a server-side portion of a payment processing system 802. In the illustrated case, the payment system is an EMV card processing payment system, but the same principles can apply to a payment processing system that is configured to process any form of payment media. The production executable 213 can also include an EMV Level 2 certified stack 803 which is used to process payment information. The client-side portion of the payment processing system 801, including the EMV Level 2 certified stack 803, and the server-side portion of the payment processing system 802 can all be encapsulated in the production executable 213 and be delivered from the SDCP infrastructure for deployment.

When the payment system begins to process payment information such as card processing inputs 811, the payment system can generate production data such as production data 217 which can be stored in database 804. The production data can be collected and looped-back to the infrastructure to improve test vectors onto future candidate executables. During a transaction, production data can be collected along the transaction flow. A Store-And-Forward (SAF) mechanism can be implemented by a specific software service running beside the payment solution (e.g., alongside EMV kernels). All sensible data is not necessarily stored because they are often captured and obfuscated at the source. In specific embodiments, the production data can be tagged following the ASN.1 standard to ease subsequent parsing and sorting. After a transaction, the production data, such as production data 217, can be forwarded by the payment solution back to a cloud service or other database of the SCDP infrastructure. Each hardware environment running the payment solution can be authenticated and be authorized to provide data to the SCDP infrastructure. The authentication can be based on a session token that is unique and establishes a trusted relationship between the payment solution client and server.

The payment solution can be a library that runs on specific hardware environments and hence is not modeled as a series of activities consuming inputs and producing outputs. However, it still takes a series of inputs and produces a set of outputs. However, some inputs must be apprehended as transitions and some outputs must be apprehended as the final state of the payment solution post transaction. In this sense the payment solution can be modeled as a state machine. In the context of EMV payment processing, the payment solution centralizes EMV configuration data and production data. The payment solution can be split up into a server part and a client part that relies on a security scheme to enable mutual authentication from a one-time token. The payment solution can provide a set of Restful and embedded APIs to allow payment applications to realize merchant's requirements with no dependencies on hardware platforms. The payment solution can be triggered by a payment application to process payment information from various payment media such as cards or other form factors such as mobile phones, key fobs, etc. When triggered, a payment kernel such as an EMV kernel is called to get issuing information from the payment media. This information will be used by the payment application to send online authorization information, and to eventually authenticate the cardholder.

Data collection system 208 is a software loop-back control that transforms production data, such as production data 217, into machine readable information, such as test data 218, that can be used by the test and analysis block 205. The data collection system 208 can include a server-side process that consumes the outcome of each transaction. The data collection system 208 can be considered as a series of parsers to analyze production data and generate different kind of test data like virtual payment media (e.g., virtual cards), payment processing configurations (e.g., EMV configurations), and metrics including a transaction descriptor.

Figure 9:
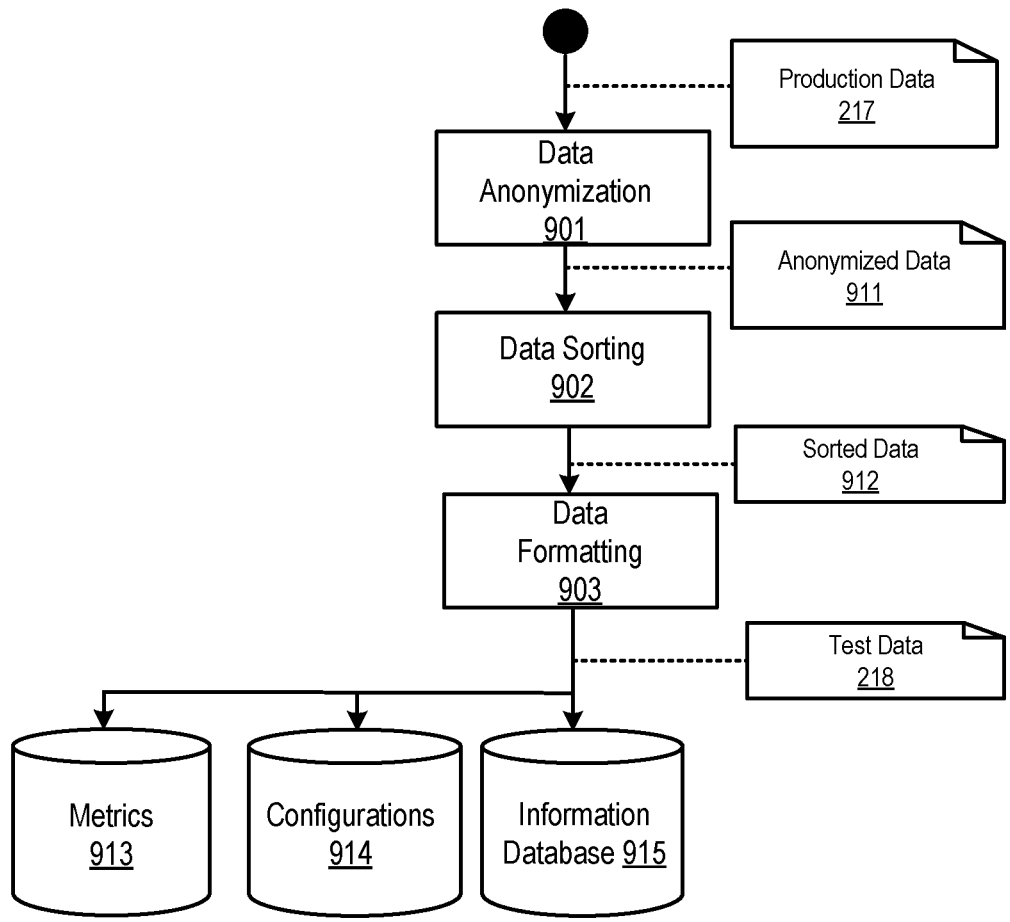
FIG. 9 provides a block diagram of a data production and segregation block in accordance with specific embodiments of the inventions disclosed herein.

FIG. 9 includes a data anonymization block 901, a data sorting block 902, and a data formatting block. The test data 218 that is generated from production data 217 can be stored in different databases based on the type of data (e.g., metrics database 913, configurations database 914, and payment information database 915). The payment information database can store payment card information. Data anonymization block 901 is a parser that removes personal information that can identify specific users. Data anonymization block 901 functions by first getting all logs having sensible data, and then obfuscating them to produce anonymized data 911. In PCI compliant payment systems all PCI related data will already have been obfuscated at transaction time and the operation of data anonymization block 901 is outside the scope of PCI compliance. Data sorting block 902 is a parser that extracts data and groups the data by category to prepare the next task. Data sorting block 902 takes anonymized data 911 as an input and outputs sorted data 912. The data sorting block 902 extracts information to create specific groups of data for different purposes like replaying the transactions for debugging, performing statistical computation, or creating new test cases. Data formatting block 903 takes sorted data 912 as an input, and outputs test data 218. Data formatting block 903 can add new information to the groups of data in the form of metadata. For example, it can extract unpredictable numbers from the virtual payment media (e.g., virtual cards) in order to be able to reproduce the exact same transaction. Data formatting block 903 can be implemented as a parser that transforms the sorted data 912 into machine readable data. Data formatting block 903 can add metadata into the information so it can be used to perform tests, analyze transactions, compare results, and conduct other test related actions.

The test data can be provided to a test and analysis system such as test and analysis block 205. Test and analysis block 205 can include a testing environment. The test and analysis block can perform automated analysis to guide code fixes implementations and update the abstract code base of the SDCP infrastructure. The code fixes, such as fixes guidance 219, can be a proposal—in the form of a text—to fix a problem. In specific embodiments, the test and analysis block 205 includes an EMV analysis module that accepts data from a testing environment, either in virtual lab testing block 202 or test and analysis block 205, regarding a simulation of a payment solution. The EMV analysis module can then conduct an analysis of the data from the testing environment and generates a report regarding at least one potential modification of the payment solution (e.g., a modification to an EMV kernel) based on the analysis. The report can include fixes guidance 219. In specific embodiments in which the payment solution is an EMV compliant payment solution, the analysis and the at least one potential modification are at the semantic level of EMV Level 2 compliance. In other words, as opposed to standard software debugging tools which spot potential code errors, the report and code fixes can spot reasons why the software would not comply with EMV Level 2 requirements and can explain those reasons with reference to the EMV Level 2 requirements. The code fix modifications can be directed to the EMV kernel. In specific embodiments, the at least one potential modification, such as those in fixes guidance 219, can reference at least one line in the source code of the payment solution. The source code may be in abstract code base 212 or in source code file 111. Regardless, by linking the error and code fix to a specific location in the source code a developer will be assisted in quickly fixing the error.

The code fixes can be provided to a software developer so that they can update abstract code base 212 from which a new version of source code file 111 can be generated. A development environment can accept the modifications to the payment solution (e.g., revisions to an EMV Level 2 kernel) and the SDCP infrastructure will then produce a revised source code file and the software binaries generator can generate a revised executable for the revised source code file. The revised source code file can be a revised version of source code file 111. The revised executable can be a revised version of candidate executable 211 and it can be provided to virtual lab testing block 202 for the revised executable to be simulated in a testing environment.

Figure 10:
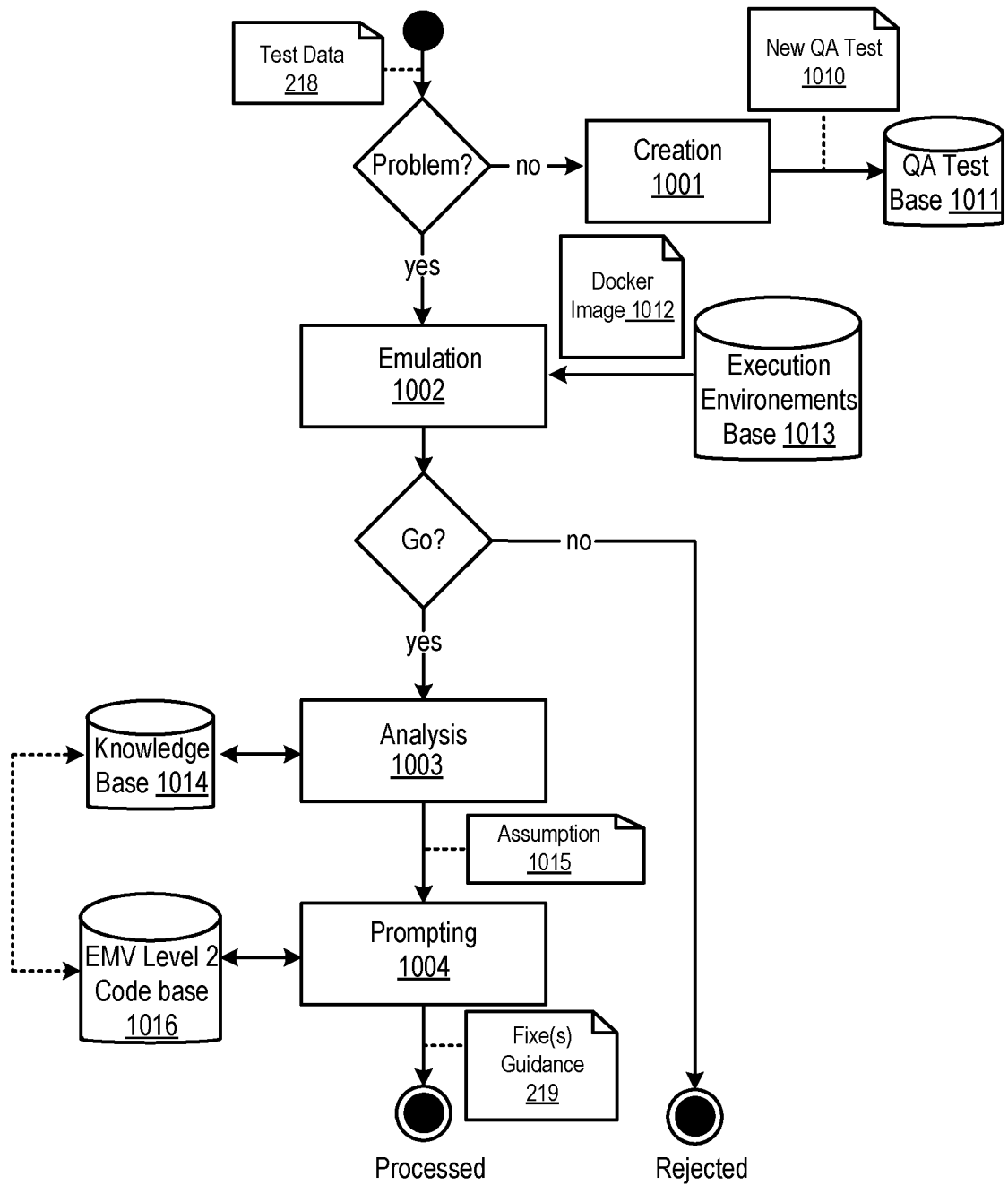
FIG. 10 provides a block diagram of a test and analysis block in accordance with specific embodiments of the inventions disclosed herein.

FIG. 10 provides a block diagram of a test and analysis block in accordance with specific embodiments of the inventions disclosed herein. The block diagram can implement test and analysis block 205. The test and analysis block helps to debug payment systems such as those integrating the payment solution generated using the SDCP infrastructure. The analysis required to determine compliance with a payment certification process such as an EMV Level 2 kernel requirement is complex. Even once it has been certified, it is possible to find code problems in EMV Level 2 systems. Furthermore, unexpected behaviors due to bad EMV configurations can also plague EMV Level 2 systems and are more frequently the cause of problems as compared to code errors. The test and analysis block of the SDCP is configured to detect and suggest code fixes that address both types of problems.

The input to the test and analysis block is test data which can include virtual payment information (e.g., virtual cards), a payment solution configuration (e.g., an EMV configuration) and metrics on the behavior of the deployed payment solution. The outputs can be new quality assurance tests 1010 and fixes guidance 219. The test and analysis block can work from normalized metadata and datasets. The metadata allows the process to build up, from scratch, an emulated environment to replay a transaction. The metadata can include the software version, which could be a reference to the proof of trust. The datasets can provide any information about the transaction including how a virtual card can be generated to emulate the problem. To support its analysis, the test and analysis block can prompt informational databases to make assumptions of what can be modified in the payment solution configuration (e.g., EMV configuration), or which section of the code is suspected to cause the problem. The test and analysis block can generate new quality assurance test cases from production data. The test and analysis block can perform a payment solution analysis at the semantic level of a certification analysis for a certification authority (e.g., at the semantic level of an EMV Level 2 analysis) from production data using virtualized environments and informational databases. These analyses lead to proposals to code fixes, such as fixes guidance 219, with recommendations to either fix either the code or the payment solution configurations (e.g., EMV configurations). The fixes guidance can be an application that can be used as an automated batch process to generate new QA tests from the production data to improve subsequent payment solutions that are developed and tested using the SDCP infrastructure (e.g., they can be used by the testing environment of virtual lab testing block 202). The QA tests can also perform payment solution analyses (e.g., EMV analyses) when a problem occurs. The QA tests can also be used by software developers to support their analysis. The developers can submit test datasets and/or prompt the system to get responses to their certification authority (e.g., EMV) puzzle.

The flow chart of FIG. 10 begins with a step of evaluating test data 218 to determine if a problem is detected. If no problem is detected, the flow chart moves to a creation block 1001. The creation block takes in the test data and outputs a QA test. The block can be instantiated as a task administrated by scripts which creates a QA test in a QA test database 1011 so that it can be used for quality assurance. The creation block transforms test data into a series of data corresponding to virtual payment information (e.g., a virtual card), a payment solution configuration (e.g., EMV configuration), pre-conditions, and a post condition. Only "new" QA tests are created in the base because it wouldn't make sense to create a new QA test each time a transaction comes in. The creation block uses a series of criteria to detect whether the test dataset is not related to a problem. For example, the transaction status is ACCEPTED or DECLINED. The creation block also uses the series of criteria to detect whether the dataset is a new case. For example, it looks for new combinations defined by the triplet AID/Issuing Country Code/Terminal Country Code. If the test data meets this combination, then a "new" QA test is created. If a problem is detected, the flow chart moves on to an emulation block 1002.

Emulation block 1002 includes the same testing environment as is used by the virtual lab testing system to simulate a payment system and also includes additional functionality. The testing environment can take a Docker image 1012 from an execution environment database 1013 as an input to simulate the payment system. Emulation block 1002 takes in test data as an input and outputs a go- or no-go decision for performing an analysis and a potential decision to reject the test data. The emulation block 1002 can interpret metadata from the test data and builds the corresponding payment solution and simulated payment system that is the source of the test data. The emulation block 1002 will, at this stage, attempt to emulate the exact same problem the test data encountered by comparing inbound metrics with the metrics obtained from the simulation. If a decision is made to conduct an analysis, the process continues to analysis block 1003 and prompting block 1004.

Analysis block 1003 take as an input information from a knowledge base 1014 and outputs assumptions 1015. The analysis block also takes account of the simulated payment system, and the payment solution when conducting the analysis. The analysis can be conducted at the semantic level of the payment solution's compliance with a certification authority's analysis (e.g., at the semantic level of EMV Level 2 compliance). The semantic level is different than the syntax level. For example, most of the debugging for EMV Level 2 compliance is done by analyzing APDU exchanges with EMV cards. If an APDU is not well formatted, there will be a problem. This can be detected by studying the syntax of APDUs. Semantic level analysis attempts to find answers to compliance issues using both the code and specifications for compliance. The semantic level goes beyond ISO 7816-4 and protocol syntax. Prompting block 1004 has access to a payment solution code base 1016 (e.g., an EMV Level 2 code base) and assumptions 1015 and generates fixes guidance 219. The application of analysis block 1003 and prompting block 1004 to a specific example of a payment solution that requires a fix guidance for an EMV Level 2 compliance issue is provided as follows.

Code snippet 1101 in FIG. 11 shows some lines of a Mastercard EMV kernel which compares the transaction amount to the reader contactless floor limit. If the amount is strictly above the floor limit, then a TVR bit (B4b8) shall be raised. Note that all lines of this code snipped are associated with a specification requirement (S456.37, S456.38). According to expected operation, the TVR B4b8 is not to be raised. However, there is an EMV configuration bug: the floor limit is not configured (set to 0) such that the amount will always be above that limit, and consequently B4b8 will always be set to 1.

In a first step, the test and analysis block emulates the problem using emulation block 1002 and automatically mounts a virtual execution environment from the metadata it has received. Then, emulation block 1002 replays the test to generate the exact same metrics. This step prepares the system for the analysis block 1003. Returning to the example above, the test dataset will show an EMV signal and a Terminal Verification Results (among others information): df 81 29 08 40 f0 f0 f0 90 f0 ff 00 (alias END APPLICATION) and 95 05 00 20 00 80 01 (alias TVR B4b8=1). This step is completed with success if and only if the emulated dataset matches the test datasets. Else, it is not possible to automate the analysis and the case is rejected.

In a second step, the test and analysis block interprets the case using analysis block 1003, and makes assumptions from: (i) transaction error indicators (Terminal Verification Result or other data objects such as an SDCP infrastructure EMV dashboard) where each error indication corresponds to a source of problem; and (ii) the sequence of commands/ responses exchanges with the card, in particular by checking where the transaction stopped. Based on predefined predicates and learned cases, the system identifies different potential sources of the problem. Predicates and learned cases are stored into informational databases such as a knowledge base. Returning to the example above, each TVR bit corresponds to one possible error (see TVR table 1102). In our example, B4b8 corresponds to the floor limit exceeded case. The system knows the amount, and the floor limit from the metrics. It can perform 2 different tests to validate its assumptions by changing either the EMV configuration or the transaction related data where the amount stands.

In a third step, the prompting block 1004 takes the assumptions, and queries the databases to find responses to the EMV puzzle. Responses are posted to a stack of processed test data (e.g., a Slack channel). Returning to the "bug" example: the process performs promptings like "find emvco_tools_or_tvr_byte". This prompting corresponds to the manipulation of the TVR that the process knows to be a potential source of problem (a bit is raised). The SDCP infrastructure can also manage an EMV dashboard that tracks other EMV sources of problems (similarly to emvco_tools_or_tvr_byte) to extend the spectrum of analysis (i.e., to extend the number of bits). That way, it is possible to triangulate a problem from error indications, lines of code, and specification references. Returning to the example above, the prompt "find emvco_tools_or_tvr_byte" will result in a series of references to lines of code that contains references to the manipulation of the TVR and specifications 1201 as shown in FIG. 12. One of the lines corresponds to the line in code snippet 1202 with the specifications reference.

In specific embodiments of the invention, the test and analysis block can be realized by triangulation which may be powered by a trained artificial intelligence. The principle of triangulation involves emulation, analyzing, and prompting. Emulation of the problem uses metadata from production data. It is an important stage because it involves mounting a virtual platform from metadata that reproduce the same problem automatically. Analyzing the metrics can involve a shared knowledge database that is reusable by all users that use an SDCP to analyze their payment solutions. The database can be fed by millions of test datasets that are normalized for readable machine-based processes. The SDCP infrastructure can promote a way to standardize EMV datasets to help the replay of EMV transactions that will lead to better tests and better system quality. Prompting involves certain factors to generate quality prompting outcomes. These factors include the code, specifications, and the metrics. All lines of code that impact the outcome of an EMV transaction are linked to a specification requirement (e.g., the EMVCo Book C-x assertion). The system is based on good code documentation (i.e., the code comments).

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. Although examples in the disclosure were generally directed to EMV Level 2 Kernels, the same approaches could be utilized for different portions of a payment solution and for similar payment media kernels that are administered by alternative verification organizations. These and other modifications and variations to the present invention may be practiced by those skilled in the art, without departing from the scope of the present invention, which is more particularly set forth in the appended claims.

What is claimed is:

1. A system comprising:
a software binaries generator for generating an executable for a source code file, wherein the source code file includes an Europay-MasterCard and Visa Consortium (EMV) kernel;
a testing environment that accepts the executable and simulates the executable with a virtual payment processing hardware system in a simulation,
wherein the testing environment verifies EMV compliance for the executable via the simulation; and
an EMV analysis module that accepts data from the testing environment regarding the simulation, conducts an analysis of the data from the testing environment, and generates a report regarding at least one potential modification of the EMV kernel based on the analysis;
wherein the analysis and the at least one potential modification are at a semantic level of EMV Level 2 compliance; and
wherein the software binaries generator generates a revised executable for a revised source code file, and the testing environment accepts the revised executable to simulate the revised executable.

2. The system of claim 1, further comprising:
a security module that generates a proof of trust for the executable in response to the testing environment verifying EMV compliance for the executable and provides the proof of trust for the executable for an external EMV compliance authority;
the proof of trust is a blockchain entry on a blockchain;
providing the proof of trust for the executable to the external EMV compliance authority comprises minting the blockchain entry on the blockchain; and
the executable is used to mint the blockchain entry.

3. The system of claim 1, wherein:
the virtual payment processing hardware system is agnostic to any specific hardware environment; and
the system further comprises a delivery module that generates, using the executable, a production executable that is packaged for a selected hardware environment.

4. The system of claim 1, wherein:
the virtual payment processing hardware system includes at least two virtual payment media; and
one of the at least two virtual payment media includes a virtual chip card.

5. The system of claim 1, wherein:
the system accepts modifications of the EMV kernel to produce the revised source code file.

6. The system of claim 5, wherein
the modifications of the EMV kernel implement the at least one potential modification of the EMV kernel.

7. The system of claim 1, wherein:
the at least one potential modification references at least one line in the source code file.

8. The system of claim 1, further comprising:
a data collection module that collects a collection of production data regarding a performance of the executable on a production device, wherein the data collection module generates a set of test data from the collection of production data;
wherein the testing environment runs an additional simulation using the set of test data.

9. The system of claim 1, wherein:
the virtual payment processing hardware system uses a database of virtual payment information.

10. A method comprising:
generating, using a software binaries generator, an executable for a source code file, wherein the source code file includes an Europay-MasterCard and Visa Consortium (EMV) kernel;
simulating the executable with a virtual payment processing hardware system, using a testing environment, in a simulation,
whereby the testing environment verifies EMV compliance for the executable via the simulation;
accepting data from the testing environment regarding the simulation, using an EMV analysis module;
conducting, using the EMV analysis module, an analysis of the data from the testing environment; and
generating, using the EMV analysis module, a report regarding at least one potential modification of the EMV kernel based on the analysis;
wherein the analysis and the at least one potential modification are at a semantic level of EMV Level 2 compliance; and
wherein the software binaries generator generates a revised executable for a revised source code file, and the testing environment accepts the revised executable to simulate the revised executable.

11. The method of claim 10, further comprising:
generating, using a security module, a proof of trust for the executable in response to the testing environment verifying EMV compliance for the executable; and
providing the proof of trust for the executable for an external EMV compliance authority;
wherein: the proof of trust is a blockchain entry on a blockchain;
providing the proof of trust for the executable to the external EMV compliance authority comprises minting the blockchain entry on the blockchain; and
the executable is used to mint the blockchain entry.

12. The method of claim 10, wherein:
the virtual payment processing hardware system is agnostic to any specific hardware environment; and
the method further comprises generating, using a delivery module and the executable, a production executable that is packaged for a selected hardware environment.

13. The method of claim 10, wherein:
the virtual payment processing hardware system includes at least two virtual payment media; and
one of the at least two virtual payment media includes a virtual chip card.

14. The method of claim 10, further comprising: accepting modifications of the EMV kernel to produce the revised source code file.

15. The method of claim 14,
the modifications of the EMV kernel implement the at least one potential modification of the EMV kernel.

16. The method of claim 10, wherein:
the at least one potential modification references at least one line in the source code file.

17. The method of claim 10, further comprising:
collecting, using a data collection module, a collection of production data regarding a performance of the executable on a production device;
generating, using the data collection module, a set of test data from the collection of production data; and
running, using the testing environment, an additional simulation using the set of test data.

18. The method of claim 17, wherein:
the virtual payment processing hardware system uses a database of virtual payment information.

* * * * *